(12) United States Patent
Odi

(10) Patent No.: US 8,249,748 B2
(45) Date of Patent: Aug. 21, 2012

(54) METHOD AND APPARATUS FOR MANAGING VOLATILE ORGANIC CONTENT IN POLYOLEFIN

(75) Inventor: Timothy O. Odi, Kingwood, TX (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 0 days.

(21) Appl. No.: 13/093,588

(22) Filed: Apr. 25, 2011

(65) Prior Publication Data

US 2011/0201765 A1    Aug. 18, 2011

Related U.S. Application Data

(62) Division of application No. 11/895,712, filed on Aug. 27, 2007, now Pat. No. 7,957,947.

(60) Provisional application No. 60/840,163, filed on Aug. 25, 2006.

(51) Int. Cl.
  *G06G 7/48* (2006.01)
  *B01J 10/00* (2006.01)
  *C07C 1/00* (2006.01)

(52) U.S. Cl. ............ 700/266; 703/12; 703/6; 703/9; 422/129; 422/131; 585/326

(58) Field of Classification Search ............ 422/129; 703/12; 700/266
See application file for complete search history.

(56) References Cited

U.S. PATENT DOCUMENTS

| | | |
|---|---|---|
| 6,818,186 B2 | 11/2004 | Burns et al. |
| 6,838,531 B2 | 1/2005 | Reid et al. |
| 6,967,230 B2 | 11/2005 | Hottovy et al. |
| 7,005,485 B2 | 2/2006 | Burns et al. |
| 7,087,685 B2 | 8/2006 | Burns et al. |
| 7,109,290 B2 | 9/2006 | McElvain et al. |
| 7,241,859 B2 | 7/2007 | Marissai et al. |
| 7,315,369 B2 | 1/2008 | Battiste |
| 7,417,095 B2 | 8/2008 | Battiste |
| 7,524,904 B2 | 4/2009 | Verser et al. |
| 7,629,421 B2 | 12/2009 | Tait et al. |
| 2005/0033016 A1 | 2/2005 | Marissai et al. |
| 2010/0004408 A1 | 1/2010 | Baita et al. |

FOREIGN PATENT DOCUMENTS

WO     WO 00/37933     6/2000

OTHER PUBLICATIONS

Hutchinson, R.A. et al., Polymerization of Olefins through Heterogenous Catalysis. VIII. Monomer Sorption Effects, Journal of Applied Polymer Sciences, 1990, vol. 41, pp. 51-81.

Qi, Jian Steven et al., Investigation of Hexane Diffusion in HDPE Particulates for Drying Applications, Ind. Eng. Chem. Res. 1996, pp. 3422-3430, Issue 35.

Kister, Henry Z., Packing Efficiency and Scaleup, Distillation Design, 1992, pp. 527-539, McGraw-Hill Publishing Company, New York.

*Primary Examiner* — Brian J Sines
(74) *Attorney, Agent, or Firm* — Fletcher Yoder

(57) ABSTRACT

The present invention relates generally to polyolefin production and to reducing volatile organic content (VOC) associated with the polyolefin. Techniques include the construction and implementation of a purge column model to calculate or estimate the VOC content in the polyolefin exiting the purge column. The techniques facilitate the design and operation of the polyolefin manufacturing process.

15 Claims, 17 Drawing Sheets

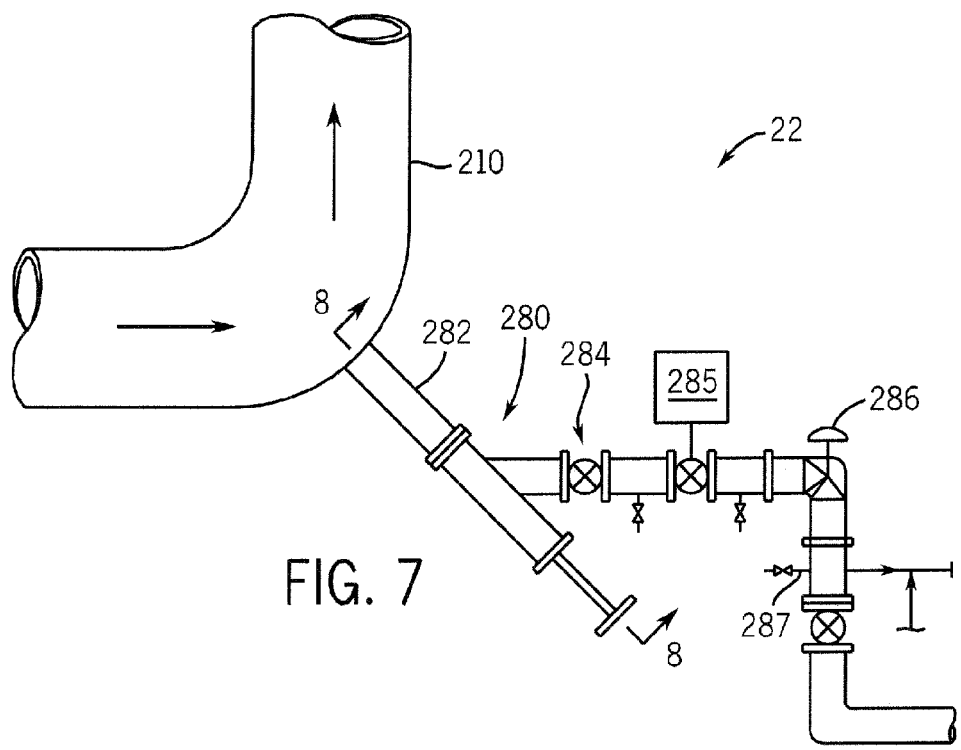
FIG. 7
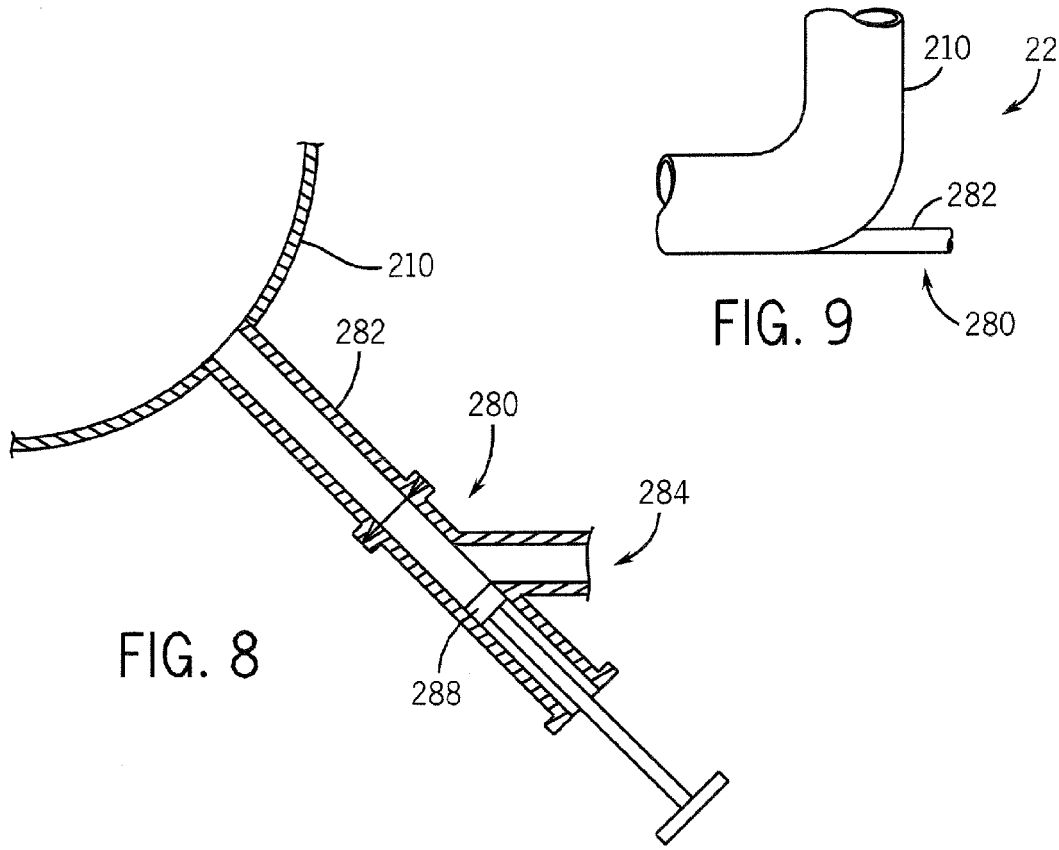
FIG. 8
FIG. 9

METHOD AND APPARATUS FOR MANAGING VOLATILE ORGANIC CONTENT IN POLYOLEFIN

RELATED APPLICATIONS

This application is a divisional application of U.S. patent application Ser. No. 11/895,712 filed on Aug. 27, 2007, which claims the benefit under 35 U.S.C. §119(e) of U.S. Provisional Patent Application No. 60/840,163 filed on Aug. 25, 2006, each of which are incorporated by reference herein.

BACKGROUND OF THE INVENTION

1. Field of the Invention

The present invention relates generally to polyolefin production and to reducing volatile organic content (VOC) associated with the polyolefin. Techniques include the construction and implementation of a purge column model to calculate or estimate the VOC content in the polyolefin stream exiting the purge column. The techniques facilitate the design and operation of the polyolefin manufacturing process.

2. Description of the Related Art

This section is intended to introduce the reader to aspects of art that may be related to aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

As chemical and petrochemical technologies have advanced, the products of these technologies have become increasingly prevalent in society. In particular, as techniques for bonding simple molecular building blocks into longer chains (or polymers) have advanced, the polymer products, typically in the form of various plastics, have been increasingly incorporated into various everyday items. For example, polyolefin polymers, such as polyethylene, polypropylene, and their copolymers, are used for retail and pharmaceutical packaging, food and beverage packaging (such as juice and soda bottles), household containers (such as pails and boxes), household items (such as appliances, furniture, carpeting, and toys), automobile components, pipes, conduits, and various industrial products.

Specific types of polyolefins, such as high-density polyethylene (HDPE), have particular applications in the manufacture of blow-molded and injection-molded goods, such as food and beverage containers, film, and plastic pipe. Other types of polyolefins, such as low-density polyethylene (LDPE), linear low-density polyethylene (LLDPE), isotactic polypropylene (iPP), and syndiotactic polypropylene (sPP) are also suited for similar applications. The mechanical requirements of the application, such as tensile strength and density, and/or the chemical requirements, such thermal stability, molecular weight, and chemical reactivity, typically determine what type of polyolefin is suitable.

One benefit of polyolefin construction, as may be deduced from the list of uses above, is that it is generally non-reactive with goods or products with which it is in contact. This allows polyolefin products to be used in residential, commercial, and industrial contexts, including food and beverage storage and transportation, consumer electronics, agriculture, shipping, and vehicular construction. The wide variety of residential, commercial, and industrial uses for polyolefins has translated into a substantial demand for raw polyolefin, which can be extruded, injected, blown or otherwise formed into a final consumable product or component.

To satisfy this demand, various processes exist by which olefins may be polymerized to form polyolefins. These processes may be performed at or near petrochemical facilities, which provide ready access to the short-chain olefin molecules (monomers and comonomers), such as ethylene, propylene, butene, pentene, hexene, octene, decene, and other building blocks of the much longer polyolefin polymers. These monomers and comonomers may be polymerized in a liquid-phase polymerization reactor and/or gas-phase polymerization reactor to form a product comprising polymer (polyolefin) solid particulates, typically called fluff or granules. The fluff may possess one or more melt, physical, rheological, and/or mechanical properties of interest, such as density, melt index (MI), melt flow rate (MFR), copolymer content, comonomer content, modulus, and crystallinity. The reaction conditions within the reactor, such as temperature, pressure, chemical concentrations, polymer production rate, and so forth, may be selected to achieve the desired fluff properties.

In addition to the one or more olefin monomers, a catalyst for facilitating the polymerization of the monomers may be added to the reactor. For example, the catalyst may be a particle added via a reactor feed stream and, once added, suspended in the fluid medium within the reactor. An example of such a catalyst is a chromium oxide containing hexavalent chromium on a silica support.

Further, a diluent may be introduced into the polyolefin reactor. The diluent may be an inert solvent and/or inert hydrocarbon, such as isobutane, propane, n-pentane, i-pentane, neopentane, and n-hexane, which is liquid at reaction conditions. However, some polymerization processes may not employ a separate diluent, such as in the case of selected examples of polypropylene production where the propylene monomer itself acts as the diluent. In general, the diluent may facilitate circulation of the polymer slurry in the reactor, heat removal from the polymer slurry in the reactor, and so on.

The slurry discharge of the reactor typically includes the polymer fluff as well as non-polymer components, such as unreacted olefin monomer (and comonomer), diluent, and so forth. In the case of polyethylene production, the non-polymer components typically comprise primarily diluent, such as isobutane, having a small amount of unreacted ethylene (e.g., 5 wt. %). This discharge stream is generally processed, such as by a diluent/monomer recovery system (e.g. flash vessel or separator vessel, purge column, etc.) to separate the non-polymer components from the polymer fluff.

The recovered diluent, unreacted monomer, and other non-polymer components from the recovery system may be treated, such as by treatment beds and/or a fractionation system, and ultimately returned as purified or treated feed to the reactor. Some of the components may be flared or returned to the supplier, such as to an olefin manufacturing plant or petroleum refinery. As for the recovered polymer (solids), the polymer may be treated to deactivate residual catalyst, remove entrained or dissolved hydrocarbons, dry the polymer, and pelletize the polymer in an extruder, and so forth, before the polymer is sent to customer.

The competitive business of polyolefin production drives manufacturers in the continuous improvement of their processes in order to lower production costs, to address environmental concerns, and so on. In an industry where billions of pounds of polyolefin product are produced per year, small incremental improvements can result in significant economic benefit, environmental progress, and so forth.

A particular issue in polyolefin production is the undesirable carryover of volatile organics (e.g., diluent, monomer, and other hydrocarbons) with and in the polymer fluff particles exiting the "wet end" of the polyolefin manufacturing process (e.g., exiting a purge column in the monomer/diluent recovery system). This stream of fluff particles exiting the wet end is generally transferred to the "dry end" (e.g., through a pneumatic conveying system) where the fluff may be stored in silos, extruded into pellets, and then loaded as pellets into containers or railcars, and the like. The hydrocarbon in the stream of polymer fluff exiting the wet end (e.g., exiting a purge column) may be entrained with the polymer fluff, dissolved in the polymer fluff, absorbed and/or adsorbed on the polymer fluff, contained within pores of the polymer fluff, and so on. The hydrocarbon may be undesirably released to the atmosphere at various points in the dry end process (e.g., in the extrusion and product loadout systems), resulting in the loss of hydrocarbon, exceeding of environmental permitting allowances, and so on.

BRIEF DESCRIPTION OF THE DRAWINGS

Advantages of the invention may become apparent upon reading the following detailed description and upon reference to the drawings in which:

FIG. 7 is a diagrammatical representation of an exemplary continuous takeoff discharge of the polymerization reactor of FIG. 5 in accordance with one embodiment of the present techniques;

FIG. 8 is a cross section along line 8-8 of FIG. 7 showing a ram valve arrangement in the continuous take off discharge assembly in accordance with one embodiment of the present techniques;

FIG. 9 is a diagrammatical representation of a tangential location for the continuous take off assembly in accordance with one embodiment of the present techniques;

DETAILED DESCRIPTION OF THE EMBODIMENTS

Figure 1:
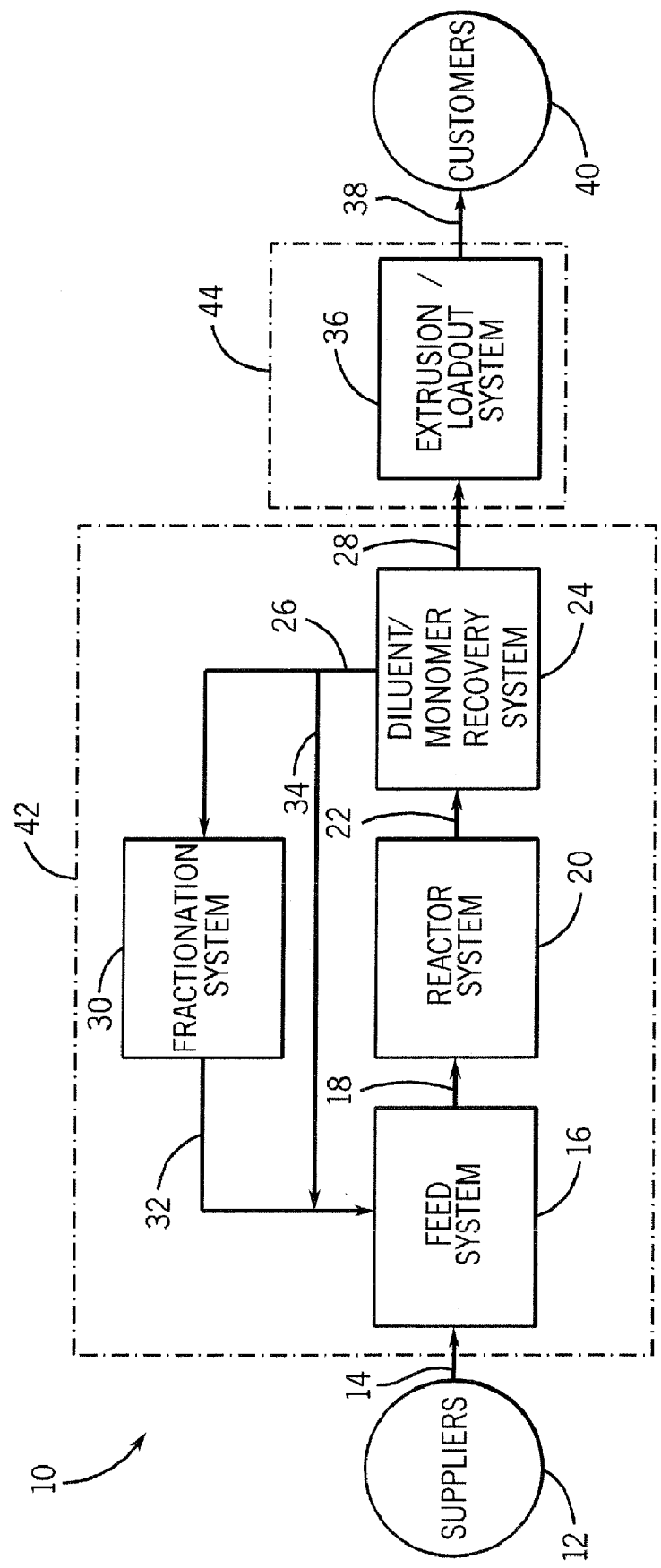
FIG. 1 is a block flow diagram depicting an exemplary polyolefin manufacturing system for producing polyolefins in accordance with one embodiment of the present techniques.

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present techniques provide for a model of a purge column in a polyolefin manufacturing process. Embodiments of the purge column model may be employed to design the purge column, as well as improve the design of upstream and downstream systems as a function of purge column performance. The purge column model may also be employed to manage and improve the operation of the purge column including providing insight on operating conditions of reducing the VOC of the polymer stream exiting the purge column It should be noted though the discussion at times may focus on the production of polyethylene and its copolymers, the disclosed techniques afford benefits in the design and operation of purge columns or purge separators in the production of other polyolefins, such as polypropylene, polybutylene, and so on. Finally, it should be apparent that the various techniques may be implemented in a multiplicity of combinations.

I. Introduction

As discussed, polyolefin processes generally employ hydrocarbon (diluent, monomer, etc.) in the production of the polyolefin polymer. For example, a diluent (e.g., inert hydrocarbon solvent such as isobutane) may be used as carrier for the polymer in the reactor (loop reactor, gas phase reactor) to facilitate circulation (or bed fluidization) and heat removal in the reactor. The inert solvent and other hydrocarbons (e.g., monomer such as ethylene) are entrained or dissolved in the polymer, and are typically purged from the polymer in a purge separator or purge column with an inert gas (e.g., nitrogen). This purging system reduces carryover of hydrocarbons (VOC's) in the raw or virgin polymer (i.e., fluff, flake, etc.) that was generated in the reactor (prior to being extruded into pellets, for example). For environmental and economic reasons, the purged hydrocarbons, purge gas (e.g., nitrogen) are recovered and reused.

In an exemplary polyethylene production system utilizing one or more loop reactors, a diluent isobutane is used as the carrier in the reactor. The isobutane is purged from the polymer in a purge column with nitrogen to tolerable hydrocarbon or VOC (volatile organic compound) limits. As discussed below, the nitrogen-rich gas having hydrocarbon discharging from the purge column is sent to an isobutane-nitrogen recovery unit (INRU) for the recovery and reuse of the hydrocarbons and nitrogen. Embodiments of the present techniques facilitate the design and operation of the purge column, and in particular, in the design and operation to reduce the VOC content of the polyolefin stream exiting the purge column. Such polymer may then be sent to an extrusion and/or product loadout area, for example. It has been generally determined or confirmed via the present techniques that factors affecting the VOC of the polymer stream exiting the purge column include, for example, fluff temperature, purge time, nitrogen flow and purity, fluff particle size, purge pressure, and resin density (or amorphous fraction), and so on. It should be emphasized that the present techniques may also be applicable to other polyolefin systems including those that employ other types of liquid-phase polymerization reactors and also gas-phase reactors.

The present invention provides for one or more models and other techniques for designing, rating, operating, and the like, a polyolefin purge column (or separator) and for evaluating the impact of process parameters on purge column performance, for example. Embodiments of the model(s) may be based on mass transfer theory and generally predict the hydrocarbon VOC for polymer stream leaving the purge column. In one example, the model is written in a Visual Basic Application program with an Excel worksheet as interface for model input and output. It should be noted that embodiments of the model have been validated with plant data from existing polyolefin processes (polyethylene and their copolymers). The validated model may be used to establish an approximate order of significance of the process variables that influence degassing of polymer fluff in the purge column.

In certain examples for a given resin density, the variables for reducing VOC in the polymer stream leaving the purge column, in decreasing order of effectiveness, may be as follows: purge column temperature, residence time or bed level of polymer in purge column; flow rate and hydrocarbon purity of purge nitrogen; particle size of polymer fluff; and operating pressure of purge column. Plant engineers and operators can rely on this exemplary list in selecting effective variables for reducing VOC in the polymer stream leaving the purge column and nitrogen waste in the purge column, as well.

Lastly, it should be noted that the present techniques including the purge column models also provide insight and improvement of processes upstream and downstream of the purge column. For example, the operation of the upstream catalyst system and/or reactor system may be adjusted in an effort to generate a desirable particle size distribution, as indicated by purge column model. In another example, the design and/or operation of the flash line coupled to the discharge of the loop reactor may be adjusted. In this particular example, the present techniques provides for placement of vents on the steam lines to the flash line to facilitate removal of non-condensable components II. Polyolefin Production Process—An Overview In the production of polyolefin, the polymerization reactor(s), which polymerize monomer into polyolefin, and the extruder(s), which convert the polyolefin into polyolefin pellets, are typically continuous operations. However, a variety of both continuous and batch systems may be employed throughout the polyolefin process. An exemplary nominal capacity for a typical polyolefin plant is about 600-800 million pounds of polyolefin produced per year. Exemplary hourly design rates are approximately 85,000 to 90,000 pounds of polymerized polyolefin per hour, and 90,000 to 95,000 pounds of extruded polyolefin per hour. However, it should be emphasized that the foregoing numerical values are only given as examples. Moreover, it should also be emphasized that the following discussion of the exemplary manufacturing process 10 is not meant to limit the applicability of the present purge column model and associated techniques.

A. Feedstocks

Turning now to the drawings, and referring initially to FIG. 1, a block diagram depicts an exemplary manufacturing process 10 for producing polyolefins, such as polyethylene homopolymer, polypropylene homopolymer, and/or their copolymers. Various suppliers 12 may provide reactor feedstocks 14 to the manufacturing system 10 via pipelines, trucks, cylinders, drums, and so forth. The suppliers 12 may comprise off-site and/or on-site facilities, including olefin plants, refineries, catalyst plants, and the like. Examples of possible feedstocks 14 include olefin monomers and comonomers (such as ethylene, propylene, butene, hexene, octene, and decene), diluents (such as propane, isobutane, n-hexane, and n-heptane), chain transfer agents (such as hydrogen), catalysts (such as Ziegler catalysts, Ziegler-Natta catalysts, chromium catalysts, and metallocene catalysts), co-catalysts (such as triethylaluminum alkyl, triethylboron, and methyl aluminoxane), and other additives. In the case of ethylene monomer, exemplary ethylene feedstock may be supplied via pipeline at approximately 800-1450 pounds per square inch gauge (psig) at 45-65° F. Exemplary hydrogen feedstock may also be supplied via pipeline, but at approximately 900-1000 psig at 90-110° F. Of course, a variety of supply conditions may exist for ethylene, hydrogen, and other feedstocks 14.

B. Feed System

The suppliers 12 typically provide feedstocks 14 to a reactor feed system 16, where the feedstocks 14 may be stored, such as in monomer storage and feed tanks, diluent vessels, catalyst tanks, co-catalyst cylinders and tanks, and so forth. In the system 16, the feedstocks 14 may be treated or processed prior to their introduction as feed 18 into the polymerization reactors. For example, feedstocks 14, such as monomer, comonomer, and diluent, may be sent through treatment beds (e.g., molecular sieve beds, aluminum packing, etc.) to remove catalyst poisons. Such catalyst poisons may include, for example, water, oxygen, carbon monoxide, carbon dioxide, and organic compounds containing sulfur, oxygen, or halogens. The olefin monomer and comonomers may be liquid, gaseous, or a supercritical fluid, depending on the type of reactor being fed. Also, it should be noted that typically only a relatively small amount of fresh make-up diluent as feedstock 14 is utilized, with a majority of the diluent fed to the polymerization reactor recovered from the reactor effluent.

The feed system 16 may prepare or condition other feedstocks 14, such as catalysts, for addition to the polymerization reactors. For example, a catalyst may be activated and then mixed with diluent (e.g., isobutane or hexane) or mineral oil in catalyst preparation tanks.

Further, the feed system 16 typically provides for metering and controlling the addition rate of the feedstocks 14 into the polymerization reactor to maintain the desired reactor stability and/or to achieve the desired polyolefin properties or production rate. Furthermore, in operation, the feed system 16 may also store, treat, and meter recovered reactor effluent for recycle to the reactor. Indeed, operations in the feed system 16 generally receive both feedstock 14 and recovered reactor effluent streams. In total, the feedstocks 14 and recovered reactor effluent are processed in the feed system 16 and fed as feed streams 18 (e.g., streams of monomer, comonomer, diluent, catalysts, co-catalysts, hydrogen, additives, or combinations thereof) to the reactor system 20. It should be noted that the feed system 16 is a source of the volatile organic compounds in the polymer fluff exiting the purge column. Moreover, the design and/or operation of the feed system may be adjusted in response to various results provided by the present purge column models.

C. Reactor System

The reactor system 20 may comprise one or more reactor vessels, such as liquid-phase or gas-phase reactors. The reactor system 20 may also comprise a combination of liquid and gas-phase reactors. If multiple reactors comprise the reactor system 20, the reactors may be arranged in series, in parallel, or in any other suitable combination or configuration. In the polymerization reactor vessels, one or more olefin monomers are polymerized to form a product comprising polymer particulates, typically called fluff or granules. The fluff may possess one or more melt, physical, rheological, and/or mechanical properties of interest, such as density, melt index (MI), melt flow rate (MFR), copolymer or comonomer content, modulus, and crystallinity. The reaction conditions, such as temperature, pressure, flow rate, mechanical agitation, product takeoff, component concentrations, polymer production rate, and so forth, may be selected to achieve the desired fluff properties.

In addition to the one or more olefin monomers, a catalyst that facilitates polymerization of the monomer is typically added to the reactor. The catalyst may be a particle suspended in the fluid medium within the reactor. In general, Ziegler catalysts, Ziegler-Natta catalysts, metallocenes, and other well-known polyolefin catalysts, as well as co-catalysts, may be used. An example of such a catalyst is a chromium oxide catalyst containing hexavalent chromium on a silica support.

Further, diluent may be fed into the reactor, typically a liquid-phase reactor. The diluent may be an inert hydrocarbon that is liquid at reaction conditions, such as isobutane, propane, n-pentane, i-pentane, neopentane, n-hexane, cyclohexane, cyclopentane, methylcyclopentane, ethylcyclohexane, and the like. The purpose of the diluent is generally to suspend the catalyst particles and polymer within the reactor. Some polymerization processes may not employ a separate diluent, such as in the case of selected polypropylene production where the propylene monomer itself may act as the diluent.

A motive device may be present within the reactor in the reactor system 20. For example, within a liquid-phase reactor, such as a loop slurry reactor, an impeller may create a turbulent mixing zone within the fluid medium. The impeller may be driven by a motor to propel the fluid medium as well as any catalyst, polyolefin fluff, or other solid particulates suspended within the fluid medium, through the closed loop of the reactor. Similarly, within a gas-phase reactor, such as a fluidized bed reactor or plug flow reactor, one or more paddles or stirrers may be used to mix the solid particles within the reactor. Moreover, the design and/or operation of the reactor system may be adjusted in response to various results provided by the present purge column models.

D. Diluent/Monomer Recovery, Treatment, and Recycle

The discharge 22 of the reactors within system 20 may include the polymer fluff as well as non-polymer components, such as diluent, unreacted monomer/comonomer, and residual catalyst. The discharge 22 may be subsequently processed, such as by a diluent/monomer recovery system 24, to separate non-polymer components 26 (e.g., diluent and unreacted monomer) from the polymer fluff 28. The untreated recovered non-polymer components 26 may be further processed, such as by a fractionation system 30, to remove undesirable heavy and light components. Fractionated product streams 32 may then be returned to the reactor system 20 via the feed system 16. On the other hand, the non-polymer components 26 may recycle more directly to the feed system 16 (as indicated by reference numeral 34), bypassing the fractionation system 30. Indeed, in certain embodiments, up to 80-95% of the diluent discharged from the reactor bypasses the fractionation system in route to the polymerization reactor.

As for the fluff 28, it may be further processed within the recovery system 24 and in the extrusion/loadout system 36, to prepare it for shipment, typically as pellets 38, to customers 40. Although not illustrated, polymer granules intermediate in the recovery system 24 and typically containing active residual catalyst may be returned to the reactor system 20 for further polymerization, such as in a different type of reactor or under different reaction conditions. The polymerization and diluent recovery portions of the polyolefin manufacturing process 10 may be called the "wet" end 42 or "reaction" side of the process 10, and the extrusion/loadout 36 portion of the polyolefin process 10 may be called the "dry" end 44 or "finishing" side of the polyolefin process 10.

E. Extrusion/Loadout System

In the extrusion/loadout systems 36, the fluff 28 is typically extruded to produce polymer pellets 38 with the desired mechanical, physical, and melt characteristics. Extruder feed may comprise additives, such as UV inhibitors and peroxides, which are added to the fluff products 28 to impart desired characteristics to the extruded polymer pellets 32. An extruder/pelletizer receives the extruder feed, comprising one or more fluff products 28 and whatever additives have been added. The extruder/pelletizer heats and melts the extruder feed which then may be extruded (e.g., via a twin screw extruder) through a pelletizer die under pressure to form polyolefin pellets. Such pellets are typically cooled in a water system disposed at or near the discharge of the pelletizer. An exemplary energy-saving technique includes the use of a pellet water pump (e.g., having a 15-50 horsepower motor) to transport the extruder pellets in the pellet water to the loadout area. This is contrast to traditional approach of employing a conventional conveying loop, which typically uses a pellet blower operating at about 250-500 horsepower.

In general, the polyolefin pellets may then be transported to a product load-out area where the pellets may be stored, blended with other pellets, and/or loaded into railcars, trucks, bags, and so forth, for distribution to customers 40. In the case of polyethylene, pellets 38 shipped to customers 40 may include low density polyethylene (LDPE), linear low density polyethylene (LLDPE), medium density polyethylene (MDPE), high density polyethylene (HDPE), and enhanced polyethylene. The various types and grades of polyethylene pellets 38 may be marketed, for example, under the brand names Marlex® polyethylene or MarFlex™ polyethylene of Chevron-Phillips Chemical Company, LP, of The Woodlands, Tex., USA.

F. Customers, Applications, and End-Uses

Polyolefin (e.g., polyethylene) pellets 38 may be used in the manufacturing of a variety of products, components, household items and other items, including adhesives (e.g., hot-melt adhesive applications), electrical wire and cable, agricultural films, shrink film, stretch film, food packaging films, flexible food packaging, milk containers, frozen-food packaging, trash and can liners, grocery bags, heavy-duty sacks, plastic bottles, safety equipment, coatings, toys and an array of containers and plastic products. Further, it should be emphasized that polyolefins other than polyethylene, such as polypropylene, may form such components and products via the processes discussed below.

Ultimately, the products and components formed from polyolefin (e.g., polyethylene) pellets 38 may be further processed and assembled for distribution and sale to the consumer. For example, a polyethylene milk bottle may be filled with milk for distribution to the consumer, or the fuel tank may be assembled into an automobile for distribution and sale to the consumer.

To form end-products or components from the pellets 38, the pellets are generally subjected to further processing, such as blow molding, injection molding, rotational molding, blown film, cast film, extrusion (e.g., sheet extrusion, pipe and corrugated extrusion, coating/lamination extrusion, etc.), and so on. Blow molding is a process used for producing hollow plastic parts. The process typically employs blow molding equipment, such as reciprocating screw machines, accumulator head machines, and so on. The blow molding process may be tailored to meet the customer's needs, and to manufacture products ranging from the plastic milk bottles to the automotive fuel tanks mentioned above. Similarly, in injection molding, products and components may be molded for a wide range of applications, including containers, food and chemical packaging, toys, automotive, crates, caps and closures, to name a few.

Extrusion processes may also be used. Polyethylene pipe, for example, may be extruded from polyethylene pellet resins and used in an assortment of applications due to its chemical resistance, relative ease of installation, durability and cost advantages, and the like. Indeed, plastic polyethylene piping has achieved significant use for water mains, gas distribution, storm and sanitary sewers, interior plumbing, electrical conduits, power and communications ducts, chilled water piping, well casing, to name a few applications. In particular, high-density polyethylene (HDPE), which generally constitutes the largest volume of the polyolefin group of plastics used for pipe, is tough, abrasion-resistant and flexible (even at sub-freezing temperatures). Furthermore, HDPE pipe may be used in small diameter tubing and in pipe up to more than 8 feet in diameter. In general, polyethylene pellets (resins) may be supplied for the pressure piping markets, such as in natural gas distribution, and for the non-pressure piping markets, such as for conduit and corrugated piping.

Rotational molding is a high-temperature, low-pressure process used to form hollow parts through the application of heat to biaxially-rotated molds. Polyethylene pellet resins generally applicable in this process are those resins that flow together in the absence of pressure when melted to form a bubble-free part. Pellets 38, such as certain Marlex® HDPE and MDPE resins, offer such flow characteristics, as well as a wide processing window. Furthermore, these polyethylene resins suitable for rotational molding may exhibit desirable low-temperature impact strength, good load-bearing properties, and good ultraviolet (UV) stability. Accordingly, applications for rotationally-molded Marlex® resins include agricultural tanks, industrial chemical tanks, potable water storage tanks, industrial waste containers, recreational equipment, marine products, plus many more.

Sheet extrusion is a technique for making flat plastic sheets from a variety of pellet 38 resins. The relatively thin gauge sheets are generally thermoformed into packaging applications such as drink cups, deli containers, produce trays, baby wipe containers, and margarine tubs. Other markets for sheet extrusion of polyolefin include those that utilize relatively thicker sheets for industrial and recreational applications, such as truck bed liners, pallets, automotive dunnage, playground equipment, and boats. A third use for extruded sheet, for example, is in geomembranes, where flat-sheet polyethylene material is welded into large containment systems for mining applications and municipal waste disposal.

The blown film process is a relatively diverse conversion system used for polyethylene. The American Society for Testing and Materials (ASTM) defines films as less than 0.254 millimeter (10 mils) in thickness. However, the blown film process can produce materials as thick as 0.5 millimeter (20 mils), and higher. Furthermore, blow molding in conjunction with monolayer and/or multilayer coextrusion technologies lay the groundwork for several applications. Advantageous properties of the blow molding products may include clarity, strength, tearability, optical properties, and toughness, to name a few. Applications may include food and retail packaging, industrial packaging, and non-packaging applications, such as agricultural films, hygiene film, and so forth.

The cast film process may differ from the blown film process through the fast quench and virtual unidirectional orientation capabilities. These characteristics allow a cast film line, for example, to operate at higher production rates while producing beneficial optics. Applications in food and retail packaging take advantage of these strengths. Finally, polyolefin pellets may also be supplied for the extrusion coating and lamination industry.

III. Polymerization Reactor Feed System

Figure 2:
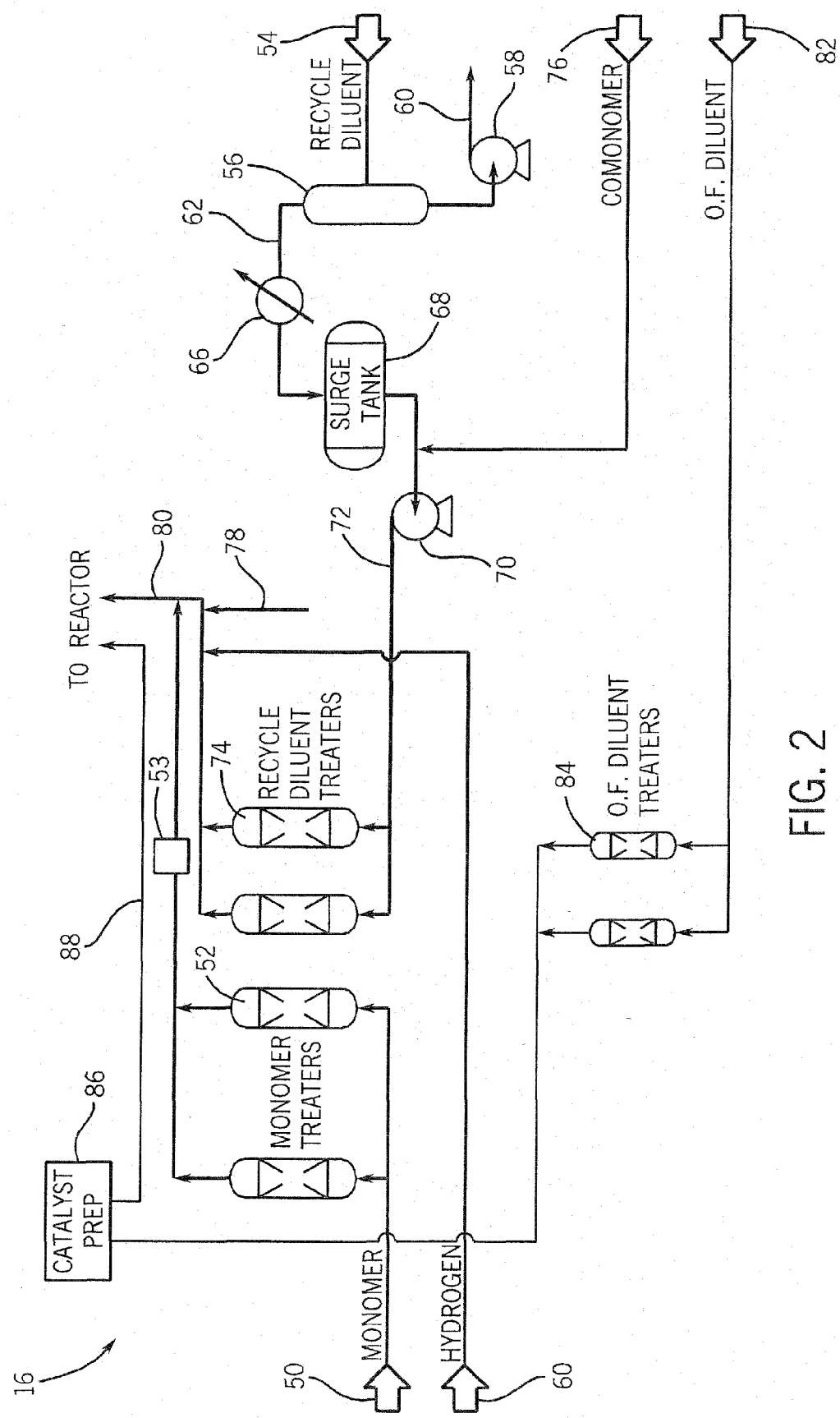
FIG. 2 is a process flow diagram of an exemplary feed system of the polyolefin manufacturing system of FIG. 1 in accordance with one embodiment of the present techniques.

Referring to FIG. 2, a process flow diagram of an exemplary reactor feed system 16 (of FIG. 1) is depicted. In this embodiment, monomer 50 (e.g., ethylene) is fed through monomer treaters 52 to the liquid phase reactor (e.g., loop slurry reactor) in the reactor system 20. Furthermore, a mass flow meter 53, instead of an orifice plate meter, may be used to measure the flow rate of ethylene to the reactor. Indeed, the flow rate of ethylene monomer 50 to the reactor generally is typically measured (and controlled) to facilitate desired operating conditions (e.g., slurry density, comonomer/monomer ratio, production rate, etc.) in the reactor and to provide the desired properties of the polyethylene formed in the reactor. The exemplary mass flow meter 53 used to measure the ethylene monomer flow may be an orifice-plate type differential pressure meter, Coriolis mass meter, and so forth.

Recycle diluent 54 (e.g., isobutane) with a relatively small amount of entrained monomer may be returned from the diluent/monomer recovery system 24 (e.g., corresponding to stream 34 of FIG. 1) and sent to the polymerization reactor. In the example of "direct" recycle to the reactor, the recycled diluent 54 may be cooled and passed through a heavies knockout pot 56, where heavy components are removed out of a bottom discharge and sent via a centrifugal pump 58, for example, as feed 60 to the fractionation system 30. The overhead 62 of the knockout pot 56 may be further cooled in a heat exchanger 66 and collected in a recycle diluent surge tank 68 for feed to the reactor. Downstream, a centrifugal pump 70 may deliver the diluent 72 through recycle diluent treaters 74 to the loop slurry reactor. It should be noted that a relatively small amount of fresh diluent (not illustrated) may be added in the fractionation system 30, for example, to make-up for diluent losses in the manufacturing process 10. Furthermore, comonomer 76 (e.g., 1-hexene) may be added to the suction of pump 70 or at other points in the recycle diluent circuit for addition to the reactor. The monomer treaters 52 and recycle diluent treaters 58 may include molecular sieve or aluminum packing, for example, configured to remove catalyst poisons from the monomer, recycle diluent, comonomer feeds, and other feeds.

Other feed components may be added to the loop slurry reactor. For example, hydrogen 60 may be added to control the molecular weight of the polyolefin formed in the reactor. Furthermore, other additives, such as antistatic materials, may be injected into the reactor, as indicated by reference numeral 78. The various component streams may combine into a single feed stream 80 for feed to the loop slurry reactor. Further, as discussed below, diluent 82 that is substantially olefin-free may be recycled from the fractionation system 30 through treaters 84 for use in the preparation of the catalyst fed to the reactor. Indeed, diluent 82 may act as a carrier of the catalyst stream 88 discharged from the catalyst preparation system 86 in route to the loop slurry reactor. Lastly, treaters have been traditionally employed to process the various feeds, such as to remove catalyst poisons from the comonomer, fresh isobutane, and hydrogen.

Figure 3:
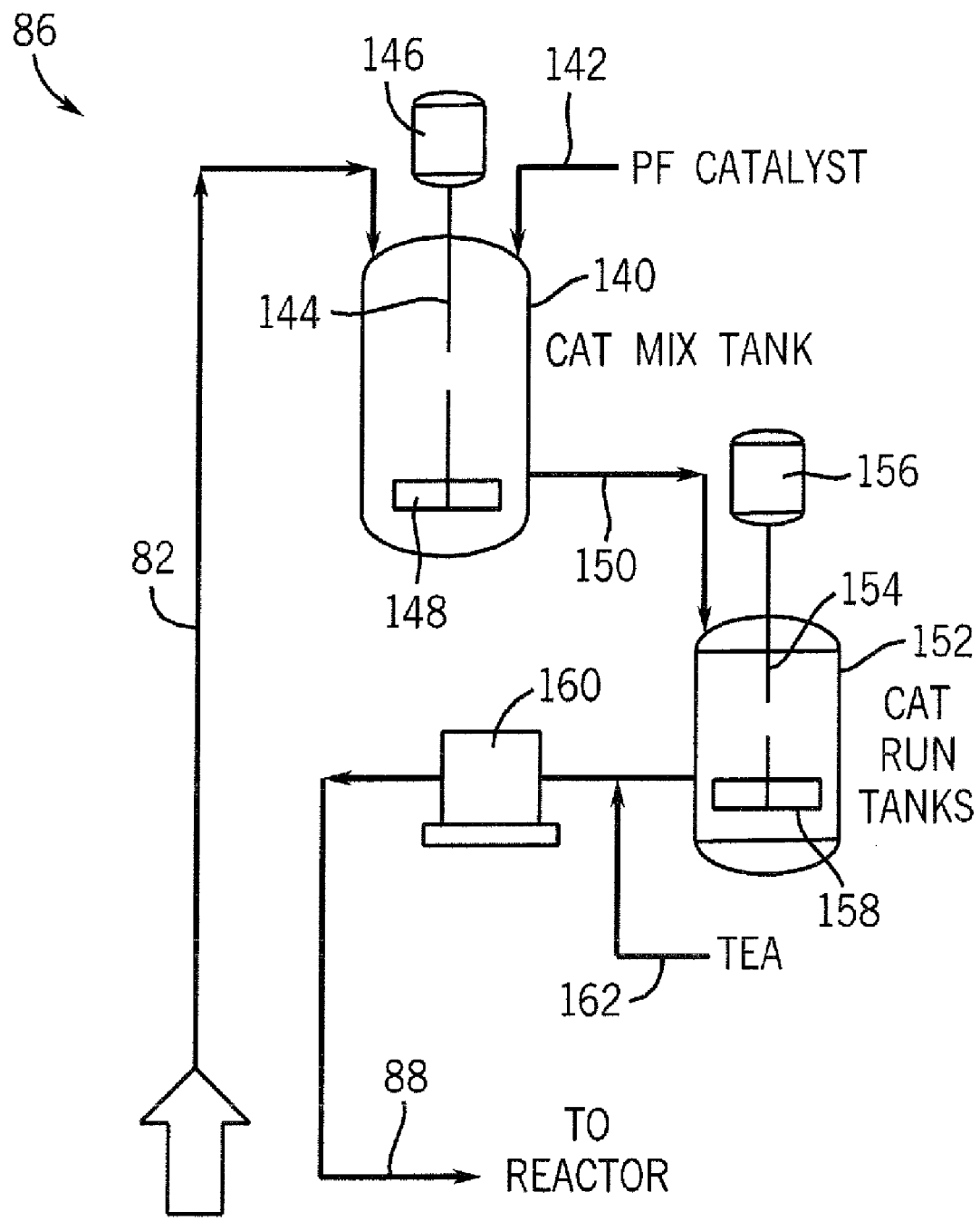
FIG. 3 is a process flow diagram of an exemplary catalyst preparation system of the feed system of FIG. 2 in accordance with one embodiment of the present techniques.

Referring to FIG. 3, a process flow diagram of the catalyst preparation area 86 is depicted. A catalyst mix tank 140 receives catalyst 142, for example, from a portable container. Olefin-free monomer 82 mixes with the catalyst in the catalyst mix tank 140. An agitator 144 having a motor and drive 146 and blade 148 may facilitate mixing of the diluent 82 and the catalyst 142 in the mix tank 140. The process catalyst 150 discharges from the mix tank 140 and may enter, for example, a catalyst run tank 152 for metering to the loop slurry reactor. The run tank 152 may also have an agitator 154 having a motor/drive 156 and agitator blade 158 to maintain the catalyst mixed with the diluent. The catalyst may be metered, for example, by a positive displacement pump 160 to the loop slurry reactor as feed stream 88. Additionally, additives, such as co-catalysts (e.g., triethylaluminum) 162, may be added to the catalyst 88 fed to the reactor. Finally, it should be noted that prior to mixing and metering the catalyst, the catalyst may be activated. For example, in the case of a chromium oxide catalyst, a catalyst activator may convert the chromium Cr3+ to Cr6+ for injection into the polymerization reactor. While in the reactor and in contact with the ethylene monomer, for example, the chromium Cr6+ may reduce to Cr2+. Moreover, the design and/or operation of the catalyst system may be adjusted in response to various results provided by the present purge column models.

Figure 4:
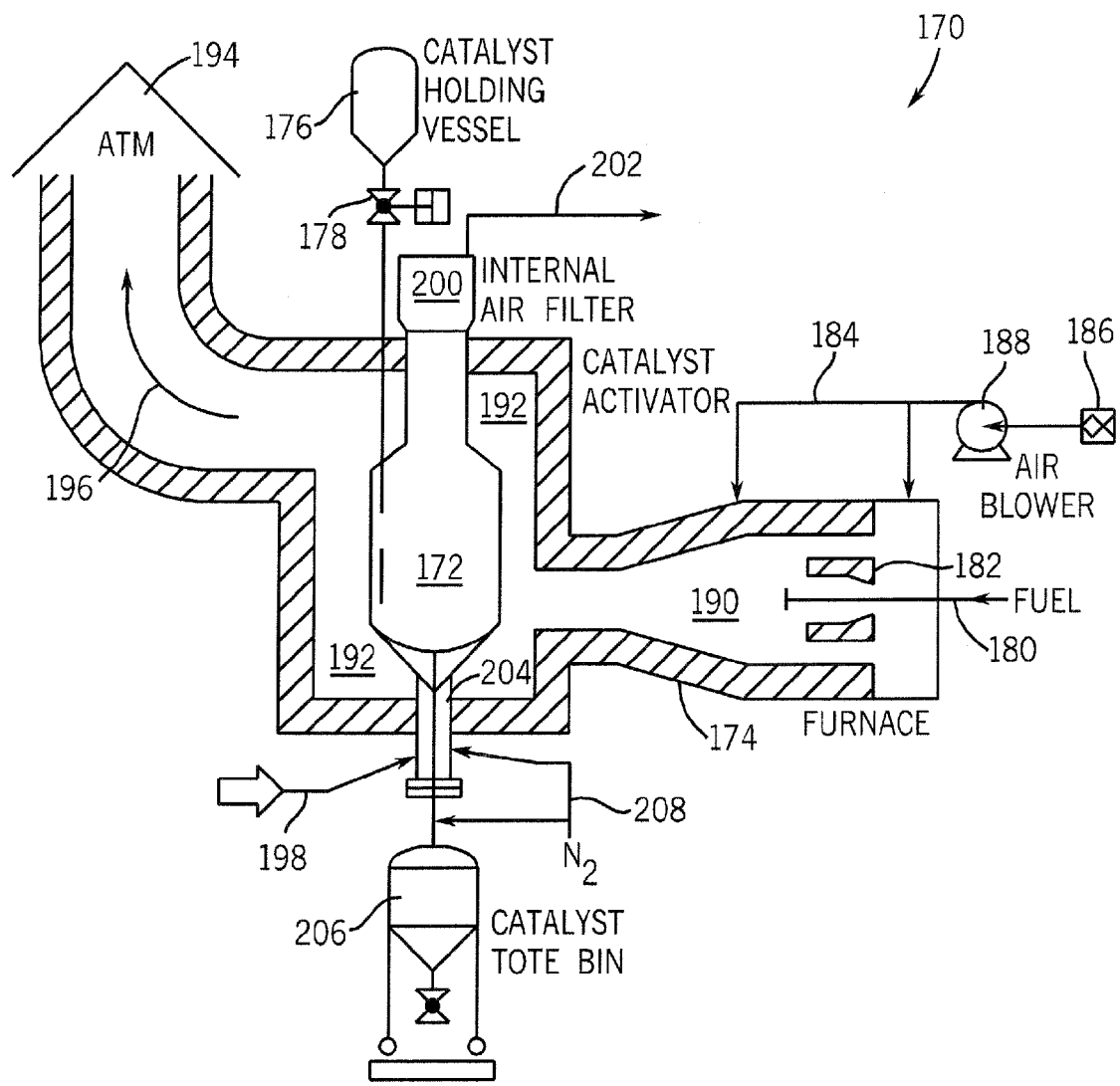
FIG. 4 is a process flow diagram of an exemplary catalyst activation system in accordance with one embodiment of the present techniques.

Referring to FIG. 4, a process flow diagram of a catalyst activator system 170 is depicted. The activated catalyst product of system 170 is fed to the catalyst mix tank 140 (catalyst 142) of FIG. 3. In FIG. 4, the catalyst activator includes an internal vessel 172 containing the catalyst, and an external furnace 174. Catalyst from the supplier may be held in a holding vessel 176 and fed via to the internal vessel via an on/off valve 178, for example. Fuel 180 may be added via a sparger or pilot 182, for example, into the furnace 180, and the fuel 180 may be combined with air 184 injected into the furnace via an air filter 186 and air blower 188. Combustion may take place inside the furnace in the region 190, for example. The region 192 surrounding the internal vessel 172 may experience operating temperatures in an exemplary range of 800 to 1700° F. The heated fluid from this region 192 may discharge to the atmosphere 194, as depicted by arrow 196.

In addition to high heat, oxygen may be supplied to activate the catalyst. Air 198 may be injected into the bottom of the internal vessel 172 to provide the presence of oxygen inside the vessel, with heat provided by the surrounding furnace 174. The air entering the vessel 172 may exit at the top via an internal air filter 200, for example, and then discharge to the atmosphere, as indicated by reference numeral 202. The activated catalyst may discharge from vessel 172 into a catalyst tote bin 206, or other container. Furthermore, nitrogen 208 may facilitate discharge of the activated catalyst into the tote bin 206, and also provide an inert atmosphere in the tote bin 206. In general, catalyst activation processes include passing dry air through a catalyst bed at a constant rate, while applying heat, until the catalyst reaches the desired temperature, at which point the catalyst is held at the activation temperature for the proper length of time. Moreover, the design and/or operation of the catalyst activation system may be adjusted in response to various results provided by the present purge column models.

IV. Polymerization Reactor System

Figure 5:
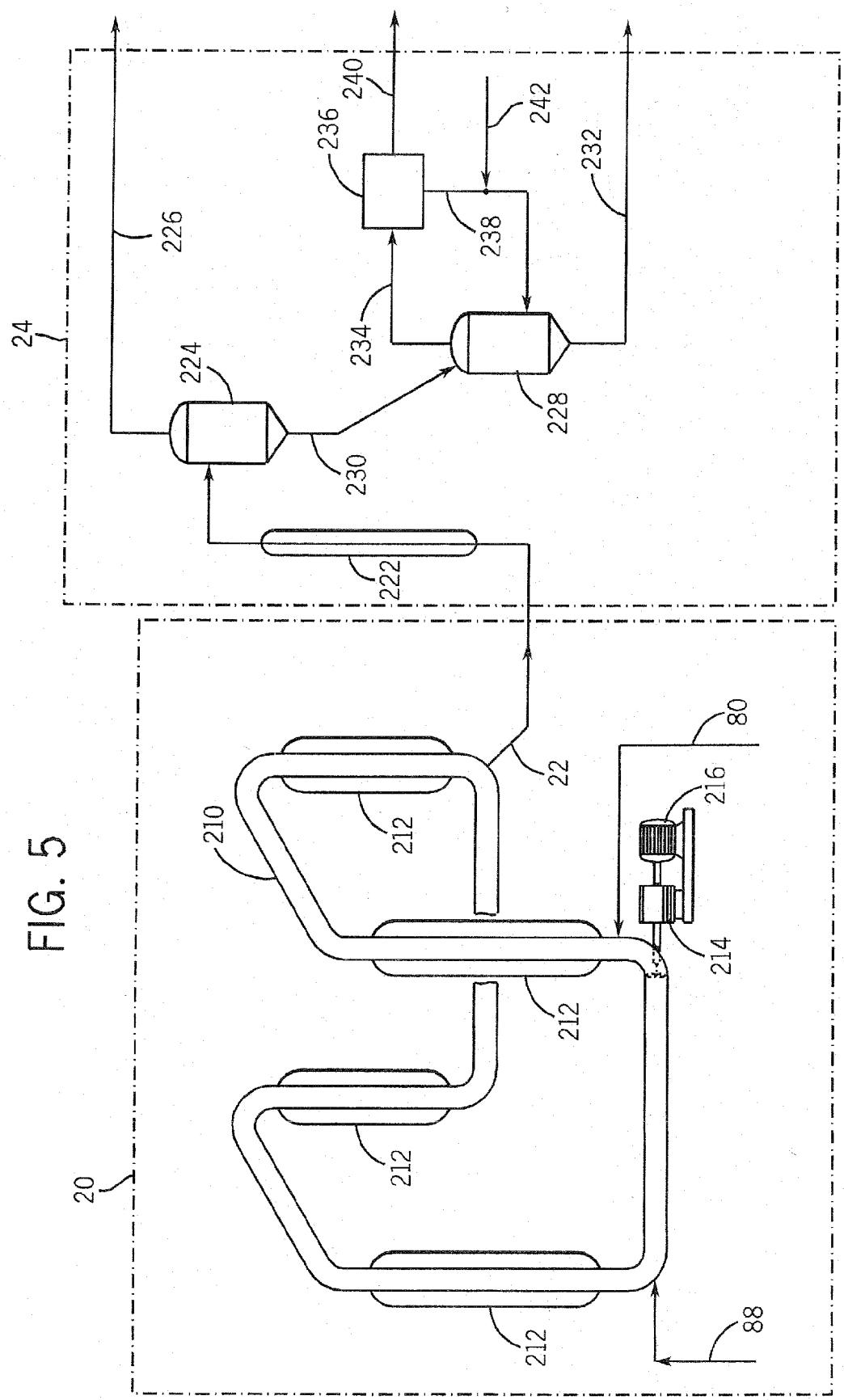
FIG. 5 is a process flow diagram of an exemplary reactor system and a diluent/monomer recovery system of the polyolefin manufacturing system of FIG. 1 in accordance with one embodiment of the present techniques.

Referring to FIG. 5, a process flow diagram of an exemplary polymerization reactor system 20 (of FIG. 1) and diluent/monomer recovery system 24 (also of FIG. 1) are depicted. As discussed above, the reactor system 20 may comprise one or more polymerization reactors, which may in turn be of the same or different types. Furthermore, in multiple reactor systems, the reactors may be arranged serially or in parallel. Whatever the reactor types comprising the reactor system 20, a polyolefin particulate product, generically referred to as "fluff" herein, is produced. To facilitate explanation, the following examples are limited in scope to specific reactor types believed to be familiar to those skilled in the art and to single reactors or simple combinations. To one of ordinary skill in the art using this disclosure, however, the present techniques are simply and easily applicable to more complex reactor arrangements, such as those involving additional reactors, different reactor types, and/or alternative ordering of the reactors or reactor types. Such arrangements are considered to be well within the scope of the present invention.

One reactor type comprises reactors within which polymerization occurs within a liquid phase. Examples of such liquid phase reactors include autoclaves, boiling liquid-pool reactors, loop slurry reactors (vertical or horizontal), and so forth. For simplicity, a loop slurry reactor 42 that produces polyolefin, such as polyethylene, polypropylene, and their copolymers, will be discussed in the context of the present techniques though it is to be understood that the present techniques are similarly applicable to other types of liquid phase reactors.

The loop slurry reactor 210 is generally composed of segments of pipe connected by smooth bends or elbows. An exemplary reactor 210 configuration includes eight jacketed vertical pipe legs, approximately 24 inches in diameter and approximately 200 feet in length, connected by pipe elbows at the top and bottom of the legs. As discussed below, reactor jackets 212 are normally provided to remove heat from the exothermic polymerization via circulation of a cooling medium, such as treated water, through the reactor jackets 212.

The reactor 210 may be used to carry out polyolefin polymerization under slurry conditions in which insoluble particles of polyolefin are formed in a fluid medium and are suspended as slurry until removed. A motive device, such as pump 214, circulates the fluid slurry in the reactor 210. An example of a pump 214 is an in-line axial flow pump with the pump impeller disposed within the interior of the reactor 210 to create a turbulent mixing zone within the fluid medium. The impeller may also assist in propelling the fluid medium through the closed loop of the reactor at sufficient speed to keep solid particulates, such as the catalyst or polyolefin product, suspended within the fluid medium. The impeller may be driven by a motor 216 or other motive force.

The fluid medium within the reactor 210 may include olefin monomers and comonomers, diluent, co-catalysts (e.g., alkyls, triethylboron, methyl aluminoxane, etc.), molecular weight control agents (e.g., hydrogen), and any other desired co-reactants or additives. Such olefin monomers and comonomers are generally 1-olefins having up to 10 carbon atoms per molecule and typically no branching nearer the double bond than the 4-position. Examples of monomers and comonomers include ethylene, propylene, butene, 1-pentene, 1-hexene, 1-octene, and 1-decene. Again, typical diluents are hydrocarbons which are inert and liquid under reaction conditions, and include, for example, isobutane, propane, n-pentane, i-pentane, neopentane, n-hexane, cyclohexane, cyclopentane, methylcyclopentane, ethylcyclohexane, and the like. These components are added to the reactor interior via inlets or conduits at specified locations, such as depicted at feed stream 80, which generally corresponds to one of the feed streams 18 of FIG. 1. Likewise, a catalyst, such as those previously discussed, may be added to the reactor 210 via a conduit at a suitable location, such as depicted at feed stream 88, which may include a diluent carrier and which also generally corresponds to one of the feed streams 18 of FIG. 1. In total, the added components generally compose a fluid medium within the reactor 210 within which the catalyst is a suspended particle.

The reaction conditions, such as temperature, pressure, and reactant concentrations, are regulated to facilitate the desired properties and production rate of the polyolefin in the reactor, to control stability of the reactor, and the like. Temperature is typically maintained below that level at which the polymer product would go into solution. As indicated, due to the exothermic nature of the polymerization reaction, a cooling fluid may be circulated through jackets 212 around portions of the loop slurry reactor 210 to remove excess heat, thereby maintaining the temperature within the desired range, generally between 150° F. to 250° F. (65° C. to 121° C.). Likewise, pressure may be regulated within a desired pressure range, generally 100 to 800 psig, with a range of 450-700 psig being typical.

As the polymerization reaction proceeds within the reactor 210, the monomer (e.g., ethylene) and comonomers (e.g., 1-hexene) polymerize to form polyolefin (e.g., polyethylene) polymers that are substantially insoluble in the fluid medium at the reaction temperature, thereby forming a slurry of solid particulates within the medium. These solid polyolefin particulates may be removed from the reactor 210 via a settling leg or other means, such as a continuous take-off, as depicted discharge stream 22. In downstream processing, the polyethylene discharged from the reactor may be extracted from the slurry and purified.

Figure 6:
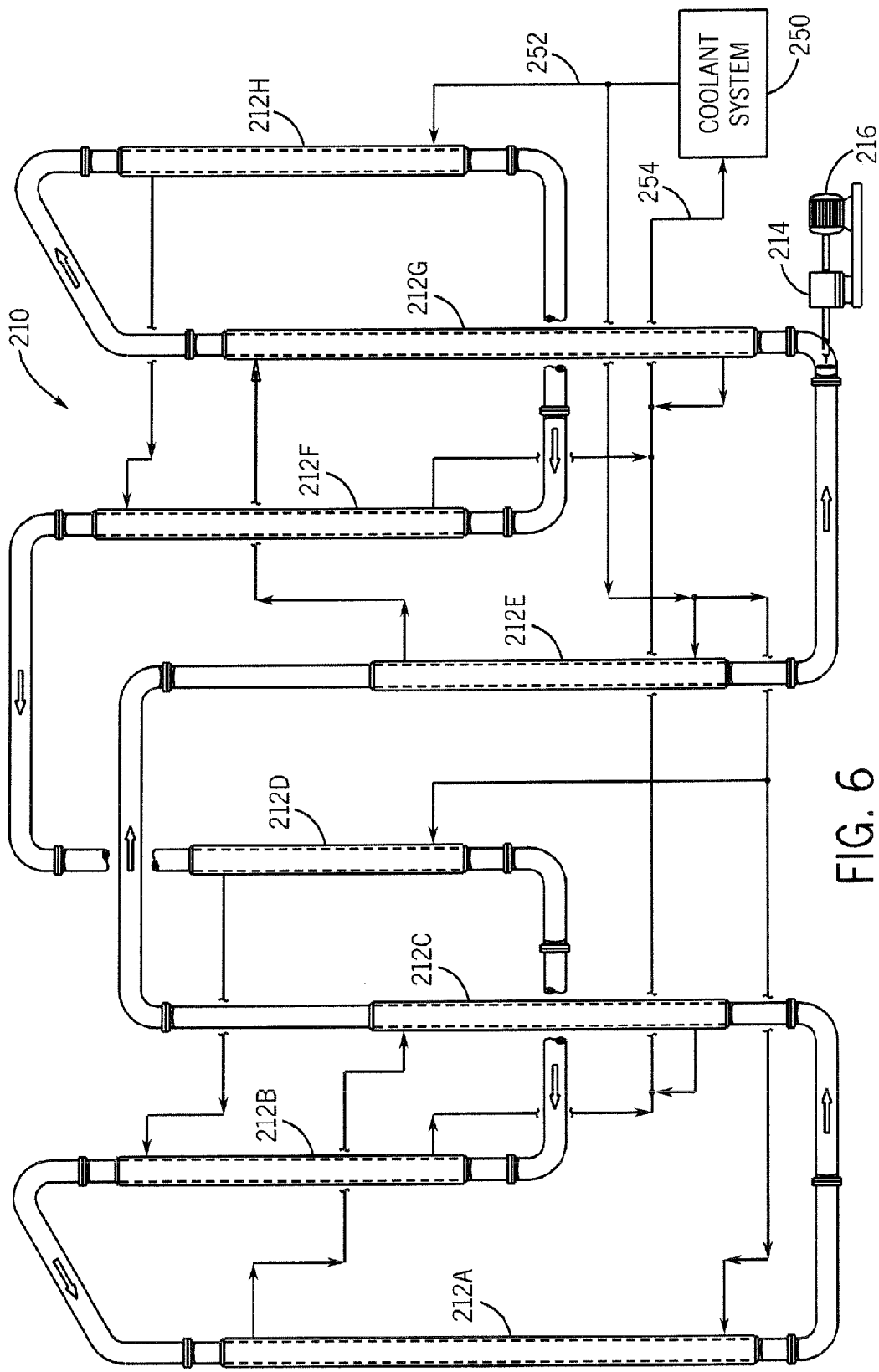
FIG. 6 is a diagrammatical representation of the exemplary polymerization reactor of FIG. 5 showing the flow of cooling medium through the reactor jackets in accordance with one embodiment of the present techniques.

FIG. 6 depicts an exemplary polymerization reactor 210 of FIG. 5 and shows a counter-current flow scheme of cooling medium through the reactor jackets 212A-H. Again, the loop reactor 210 is generally composed of segments of pipe connected by smooth bends or elbows. A motive device, such as pump 214, circulates the fluid slurry in the reactor 210. An example of a pump 214 is an in-line axial flow pump with the pump impeller disposed within the interior of the reactor 210.

A coolant system 250 removes heat from the loop reactor 210 via reactor jackets 212A-H. The coolant system 250 provides a coolant supply 252 (e.g., treated water) and processes a coolant return 254.

As the polymerization reaction proceeds within the reactor 210, the reaction conditions may be controlled to facilitate the desired degree of polymerization and the desired reaction speed while keeping the temperature below that at which the polymer product would go into solution. As mentioned, due to the exothermic nature of the polymerization reaction, cooling jackets 212A-H may be provided around portions of the closed loop system through which a cooling fluid is circulated as needed to remove excess heat (heat of reaction), thereby maintaining the temperature within the desired range, generally between 150° F. to 250° F. (65° C. to 121° C.).

In general, reactor temperature varies linearly with changes in the reactor system operating conditions. An accepted assumption in the art is that heat generated in the reactor by the exothermic polymerization is linear with the polyolefin production rate (i.e., pounds per hour of polyolefin polymerized). Thus, reactor temperature, which is an indication of the energy or heat in the reactor, varies linearly with production rate. As appreciated by those of ordinary skill in the art, typical reactor temperature control may involve a proportional-integral-derivative (PID) algorithm.

V. Diluent/Monomer Recovery System

A. Flash Chamber

Returning to FIG. 5, the discharge 22 from the reactor 210 may flow through an in-line flash heater 222 and into a flash chamber 224. The in-line flash heater 222 may be a surrounding conduit that uses steam or steam condensate, for example, as a heating medium to provide indirect heating to the discharge 22. Thus, the loop slurry reactor 210 effluent (discharge 22) is heated prior to its introduction into the flash chamber 224. Also, before the discharge 22 enters the flash chamber 224, water or other catalysts poisons may be injected into the discharge 22 to deactivate any residual catalysts in the discharge 22 stream. Because these injected components are catalysts poisons by definition, they are typically completely removed, or at least substantially removed, from any recovered material (e.g., monomer or diluent) recycled to the reactor 210.

In the flash chamber 224, most of the non-solid components of the reactor discharge 22 are withdrawn overhead as vapor in the flash gas 226. Note, it is this recycled flash gas 226 that may bypass the fractionation system in route to the reactor 210 (i.e., via the feed system 16). In polyethylene production, this vapor is typically primarily diluent, such as isobutane or other diluents previously mentioned. It may also contain most of the unreacted monomer (e.g., ethylene) and other light components, as well as unreacted comonomer (e.g., 1-hexene, butene, 1-pentene, 1-octene, and 1-decene) and other heavy components (e.g., hexane and oligomers). In general light components or "lights" may be defined at those light components with lower boiling points than the diluent employed. In contrast heavy components or "heavies" may be defined as those components having higher boiling points than the diluent. An exemplary approximate composition of the flash gas 226 is 94 wt. % isobutane, 5 wt. % ethylene, and 1 wt. % other components. A level or volume of fluff may be maintained in the flash chamber 224 to give additional residence time of the fluff in the chamber 224 to facilitate separation of liquid and vapor entrained in the porous fluff particles.

The flash gas 226 may be processed in equipment such as cyclones, bag filters, etc., where entrained fluff solids are removed and returned to the flash chamber 224 or to downstream equipment, such as the purge column discussed below. The flash gas 226 may also travel through a deoxygenation bed, for example. Furthermore, the flash gas 226 may be cooled or condensed in a heat exchanger (e.g., shell-and-tube construction) prior to its recycle to the feed system 16 or fractionation system 30.

As for the solids (polymer) in the flash chamber 224, they are withdrawn with a small amount of entrained diluent (and monomer) and sent to a purge column 228 via solids discharge 230. As will be appreciated by those of ordinary skill in the art, the solids discharge 230 conduit may include valve configurations that allow polymer to flow downward through the conduit while reducing the potential for vapor to flow between the purge column 228 and the flash chamber 56. For example, one or more rotary or cycling valves may be disposed on the solids discharge 230 conduit. Furthermore, a relatively small fluff chamber may also be disposed on the conduit to handle the discharge of the fluff solids from the flash chamber 224 to the purge column 228. Such a discharge to the purge column 228 may include appropriate valve configurations, a surge chamber, or simply a conduit, and so on. Moreover, other arrangements in the flash/purge system are applicable. For example, the fluff solids from the flash chamber 224 may discharge to a lower pressure flash chamber (with the lower pressure flash gas compressed for recycle to fractionation system 30 and reactor) prior to introduction of the fluff solids to the purge column 228.

Finally, as discussed, the system 10 may provide for direct recycle of 80 to 95 wt. % of the diluent and unreacted monomer recovered from the in the monomer/recovery system 24 to the feed and reactor systems 16 and 20. For example, flash gas 226 (FIG. 7) which discharges from the flash chamber 224 overhead, and which generally corresponds to the recycle stream 34 of FIG. 1, may be sent as the recycle diluent 54 stream (FIG. 2) directly to the reactor 210 via the surge tank 68. Such direct recycle significantly reduces the load on the fractionation system 30, including the load on the fractionation columns and reboilers in the system 30 (as compared with no direct recycle). Thus, the fractionation columns and associated reboilers (e.g., steam reboilers) may be significantly reduced in size (e.g., reduced by 80-95% of the conventional size) for the same capacity polyolefin plant. Steam usage is significantly reduced and substantial energy by employing the smaller columns. Lastly, it should be noted that the design and/or operation of the fractionation system 30 may be adjusted in response to the output of the present purge column models.

B. Purge Column

The primary solids feed to the purge column 228 is typically the solids discharge 230 (polyolefin fluff) that exits the flash chamber 224. A purpose of the purge column 228 is to remove residual hydrocarbon from the entering solids streams and to provide substantially-clean polymer fluff 232 with relatively small amounts of entrained volatile organic content (VOC). The fluff 232 may be transported or conveyed to the extrusion/loadout system 36 for conversion to pellets 38, and for distribution and sale as polyolefin pellet resin to customers 40. In general, the treated polymer particles discharged from purge column 228 as polymer fluff 232 may be processed in a conventional finishing operation, such as a screw extruder, in the extrusion/load out system 36 (FIG. 1).

In the exemplary purge column system illustrated, nitrogen is circulated through purge column 228 to remove residual hydrocarbons via overhead discharge 234. This discharge 234 may be sent through a separation unit 236, such as a membrane recovery unit, pressure swing adsorption unit, refrigeration unit, and so forth, to recover nitrogen via nitrogen stream 238, and to discharge a separated hydrocarbon stream 240 as feed to the fractionation system 30. In the art, the separation unit 236 may be known as an Isobutane Nitrogen Recovery Unit (INRU) or Diluent Nitrogen Recovery System (DNRU). Moreover, fresh nitrogen 242 may be added to the nitrogen circuit to account for nitrogen losses in the purge column 228 system. Finally, it should be noted that the hydrocarbon stream 240 may beneficially provide feed to the fractionation system 30 (see FIG. 13). For example, the hydrocarbon stream 240 discharging from the separation unit 236 makes available hydrocarbon feed that may be processed to give the olefin-free diluent used in catalyst preparation.

An exemplary purge column 228 may be cylindrical vessel having a relatively tall vertical section, a cover or head at the top, sloped sides or conical shape at the bottom with an opening for polymer fluff discharge. The polymer fluff to be degassed of volatile hydrocarbons may enter the vessel at the top, while the purge gas, typically nitrogen, may be introduced to the vessel in the slopped bottom sides. Flow may be countercurrent between the purge gas and polymer fluff in the vessel. Again, in certain embodiments, the hydrocarbon rich purge gas leaves the vessel through an opening at the top, while the degassed fluff leaves at the bottom of the vessel.

Degassing effectiveness in the vessel may be predicated on the maintenance of uniform plug flow of the polymer fluff and purge gas in the vessel, thereby ensuring good contact between the two. The diameter of the vessel typical range from 5 to 6 feet, but its length (L/D ratio) is chosen to achieve a residence time (e.g., 30 to 180 minutes) sufficient for degassing the polymer fluff. Example L/D ratios may range from 4 to 8, or outside this range. Lastly, it should be noted that internals may be employed in the purge column, such as a distributor plate for introducing purge gas (nitrogen), an inverted cone for facilitating plug glow of the polymer (e.g., reduce bridging or channeling of the polymer fluff), and so on.

C. Alternate Configurations of the Diluent/Monomer Recovery System

As will be appreciated by those of ordinary skill in the art, a variety of configurations may be employed in the diluent/monomer recovery system 24. For example, the solids discharge 230 from the flash chamber 224 may be sent to another reactor (e.g., a gas phase reactor) instead of to the purge column 228 or to a low-pressure flash chamber. The polymer may then later enter the purge column 228 (i.e., from the gas phase reactor or low-pressure flash chamber). If discharged to another reactor from the flash chamber 224, catalyst poison may not be injected upstream in the discharge 22, and, thus, residual active catalysts remain for further polymerization. In another configuration, the purge column 228 may be combined with a downstream extruder feed tank. The separation unit 236 associated with the purge column 228 may then accommodate the new purge column/extruder feed tank combination, for example.

VI. Continuous Take Off of the Reactor Effluent Discharge

FIGS. 7-9 illustrate a continuous take-off mechanism of the reactor discharge 22. Referring to FIG. 7, a continuous takeoff mechanism 280 disposed on a pipe elbow of the loop slurry reactor 210, is depicted. The continuous takeoff mechanism 280 includes a take-off cylinder 282, a slurry withdrawal line 284, an emergency shut-off valve 285, proportional motor valve 286 to regulate flow, and a flush line 287. The reactor 210 may be operated "liquid" full, and because the reactor liquid contents are slightly compressible, pressure control of the liquid through the system may be accomplished with a valve. Further, where diluent input is held substantially constant, and the proportional motor valve 58 may be used to control the rate of continuous withdrawal and to maintain the total reactor pressure within designated set points.

Referring to FIG. 8, which is taken along section line 8-8 of FIG. 7, a smooth-curved pipe elbow having the continuous take-off mechanism 280, is depicted. Thus the illustrated pipe elbow may be considered am appendage-carrying elbow. As shown, the mechanism includes take-off cylinder 282, which is attached, in this instance, at a right angle to a tangent to the outer surface of the elbow. Further, coupling to the cylinder 282 is the slurry withdrawal line 284. Disposed within the take off cylinder 282 is a ram valve 288, which may serve at least two purposes. First, it may provide a clean-out mechanism for the take-off cylinder if it should ever become fouled with polymer, for example. Second, it may serve as a shut-off valve for the entire continuous take-off assembly.

FIG. 9 shows an attachment orientation for the take-off cylinder 282, which is affixed tangentially to the curvature of the elbow and at a point just prior to the slurry flow turning upward. The opening may be elliptical to the inside surface, for example, and further enlargement may be implemented to improve solids take-off. Finally, it should be noted that a variety of orientations of the attachment of the take-off cylinder 282 may be implemented.

A continuous take-off of product slurry of an olefin polymerization reaction carried out a loop reactor in the presence of an inert diluent allows operation of the reactor at a much higher solids concentration than with the conventional settling leg(s) used to discharge the polymer. For example, production of predominantly ethylene polymers (polyethylene) in isobutane diluent has generally been limited to a maximum solids concentration in the reactor of 37-40 weight percent (wt. %) with the settling leg configuration. However, the continuous take-off (CTO) has been found to allow significant increases in solids concentration. As a result, solids concentration of greater than 50 wt. % in the reactor may be implemented with the continuous takeoff. It should be emphasized that in a commercial operation, as little as a one percentage point increase in solids concentration is of major significance. Such an increase, for example, allows higher production rates of polyethylene.

VII. Extrusion/Loadout System

Figure 10:
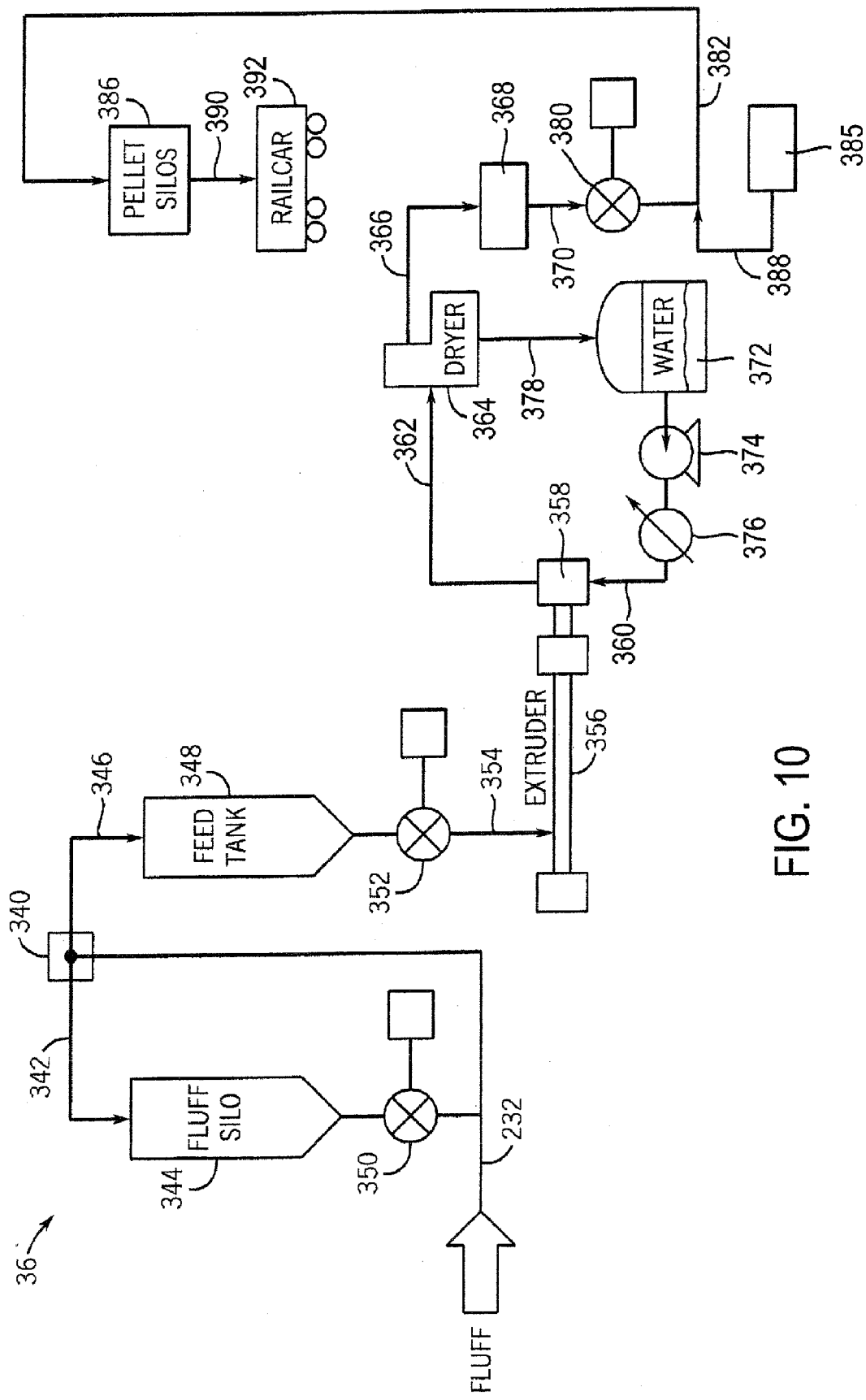
FIG. 10 is a process flow diagram of the extrusion/loadout system of FIG. 1 in accordance with one embodiment of the present techniques.

Referring to FIG. 10, a process flow diagram of the extrusion/loadout system 36 of FIG. 1 is depicted. Polyolefin fluff 232 from the purge column 228 (FIG. 5) may be pneumatically transferred, for example, using a dilute phase blower, through a valve 340 in the extruder/loadout system 36, and either into conduit 342 to the fluff silo 344, or into conduit 346 to the extruder feed tank 348. The fluff silo 344 may be used to provide surge capacity during shutdown of the extruder (or of other operations) in the extrusion/loadout system 36. On the other hand, the fluff silo 344 may also accumulate fluff to allow for full-rate operation of the extruder while the upstream polymerization reactor 210 "catches up" during start up of the reactor 210. The polyolefin fluff in silo 344 may be pneumatically transferred to the extruder feed tank through rotary valve 350 with the aid of a blower system 351.

Typically, however, the primary flow of polyolefin fluff 232 (which may generally correspond to fluff 28 of FIG. 1) is to the extruder feed tank 348 via conduit 346. Downstream, rotary valve fluff 352 may feed polyolefin fluff 354 to the extruder 356, where the extruder heats, melts, and pressurizes the polyolefin fluff 354. As will be appreciated by those of ordinary skill in the art, the fluff 354 from the extruder feed tank 348 may be metered to the extruder 356 with a variety of meters, such as smart flowmeter-type, master-feeder type, and so forth. Furthermore, additives may be injected into the fluff 354 stream at an addition rate that may be based on a specified ratio to the mass flow rate of the fluff 354. This ratio or "slave" feed of additives to fluff 354 may be specified at a value to generate a desired recipe, for example, for each polyolefin grade or product, and to give the desired properties of the downstream polyolefin pellets. Furthermore, the additive addition may be accomplished with a liquid additive system, loss-in-weight-feeders, and the like. In certain embodiments, one or more of lost-in-weight feeders may be used to meter a pre-mixed additive package fed from a bulk container, for example, to the extruder 356 via the fluff 354 stream, an extruder 354 feed hopper, directly to the extruder 354, and so on.

In general, the extruder 356 may melt, homogenize, and pump the polyolefin polymer and additives through a pelletizer 358, which may include a screen pack and heated die head, for example, which pelletizes the mixture of fluff and additives. Further, pelletizer knife blades (i.e., under water) may cut the polyolefin melt extruded through the die into pellets. The pellets are typically quenched by water 360 and may travel in a pellet-water slurry 362 from the pelletizer 358 to a pellet dewatering dryer 364. The dryer 364 may separate the free water and then dry the remaining surface water from the pellets by centrifugal force. The dried pellets 366 may discharge onto a scalping screen 368, for example, which removes oversized and undersized pellets from on-specification pellets 370.

Water 360 may be supplied to the pelletizer 358 from a water tank 372 via a centrifugal pump 374 and cooler 376 (e.g., shell and tube heat exchanger). Water 378 removed from the pellet dryer 364 may return to the water tank 372. The polyolefin pellets 370 exiting the scalping screen 368 may fall by gravity through a rotary valve 380 into a dense-phase pneumatic conveying line 382, for example, and transported to pellet silos 384. The pellet silos may include storage tanks, blenders, off-specification storage tanks, and so on. In the illustrated embodiment, the blower package 385 provides nitrogen and/or air 388 to convey the pellets 370 via conveying line 382 to the pellet silos 386. Polyolefin pellets 390 may be loaded into rail cars 392, hopper cars, trucks, tote bins, bags, and so on. Pellets 390 may be loaded into hopper cars, for example, using a gravity type, air assisted, multiple-spout, loading system. Such a system may allow the hopper car to be automatically loaded at a rate higher than the polymerization and extrusion production rate. Thus, extra "time" generated by the higher loadout rates may be exploited to provide time to move the hopper cars or rail cars after filling, and to spot the next empty car. Lastly, it should be noted that VOC in the polyolefin fluff stream 232 from the purge column 228 (FIG. 5) may collect at various points in the extrusion/loadout system 36. Moreover, the VOC may escape or be vented to the atmosphere from various points in the extrusion/loadout system 36.

VIII. Purge Column Model

A. Exemplary Results

FIGS. 11-16 show example results of sensitivity studies with an exemplary model to evaluate the impact of purge parameters (e.g., fluff temperature, residence time, nitrogen flow, particle size, and pressure) on the VOC of polyolefin polymer (i.e., fluff) stream leaving the purge column. The exemplary model is based on mass-transfer theory discussed in detail the following sections below. As expected, the VOC of the polymer stream decreased for higher fluff temperature, longer residence time, higher purge gas flow (e.g., inert gas, nitrogen, air, etc.), smaller polymer particle size, and lower purge pressure. It is believed that these parameter trends generally enhance the diffusion of absorbed or adsorbed hydrocarbon components from the polymer. Highlights of the exemplary results are discussed below.

Figure 11:
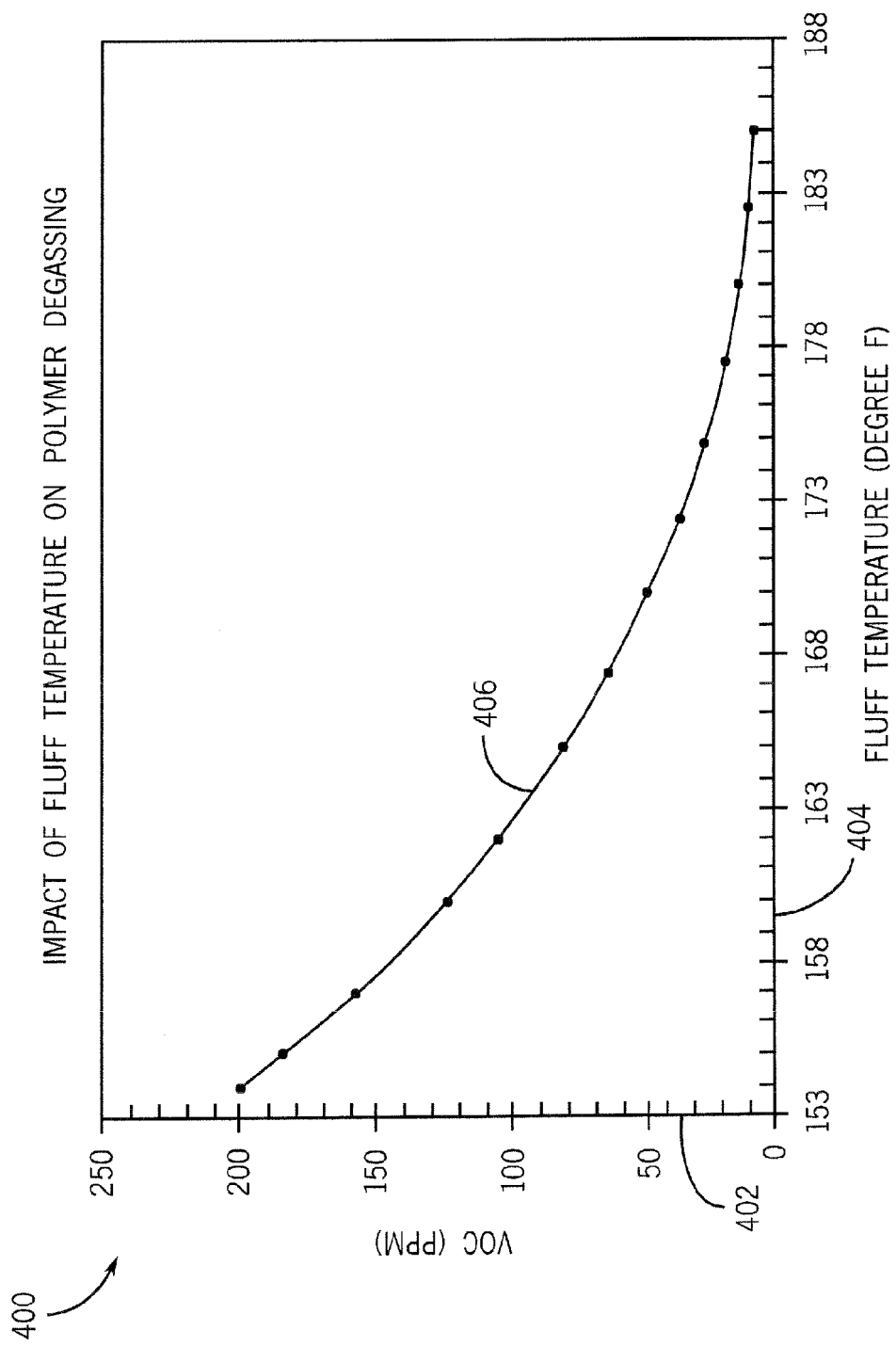
FIG. 11 is an exemplary plot of VOC (part per million or ppm) in the polymer fluff stream exiting a purge column versus the polymer fluff temperature (° F.) in the purge column in accordance with one embodiment of the present techniques.

FIG. 11 is an exemplary plot 400 of model results of VOC 402 in ppm (part per million—volatile organics in the polyolefin fluff stream leaving the purge column) versus the temperature 404 of the polyolefin (fluff) in degrees Fahrenheit. The curve 406 illustrates an example inverse relationship between the VOC 402 and the fluff temperature 404. In this example, increasing polyolefin fluff temperature in the purge column from 160° F. to 176° F. (10% change) resulted in about 80% reduction in VOC, from 128 ppm to 25 ppm, as depicted in the exemplary plot 400 of FIG. 11.

Figure 12:
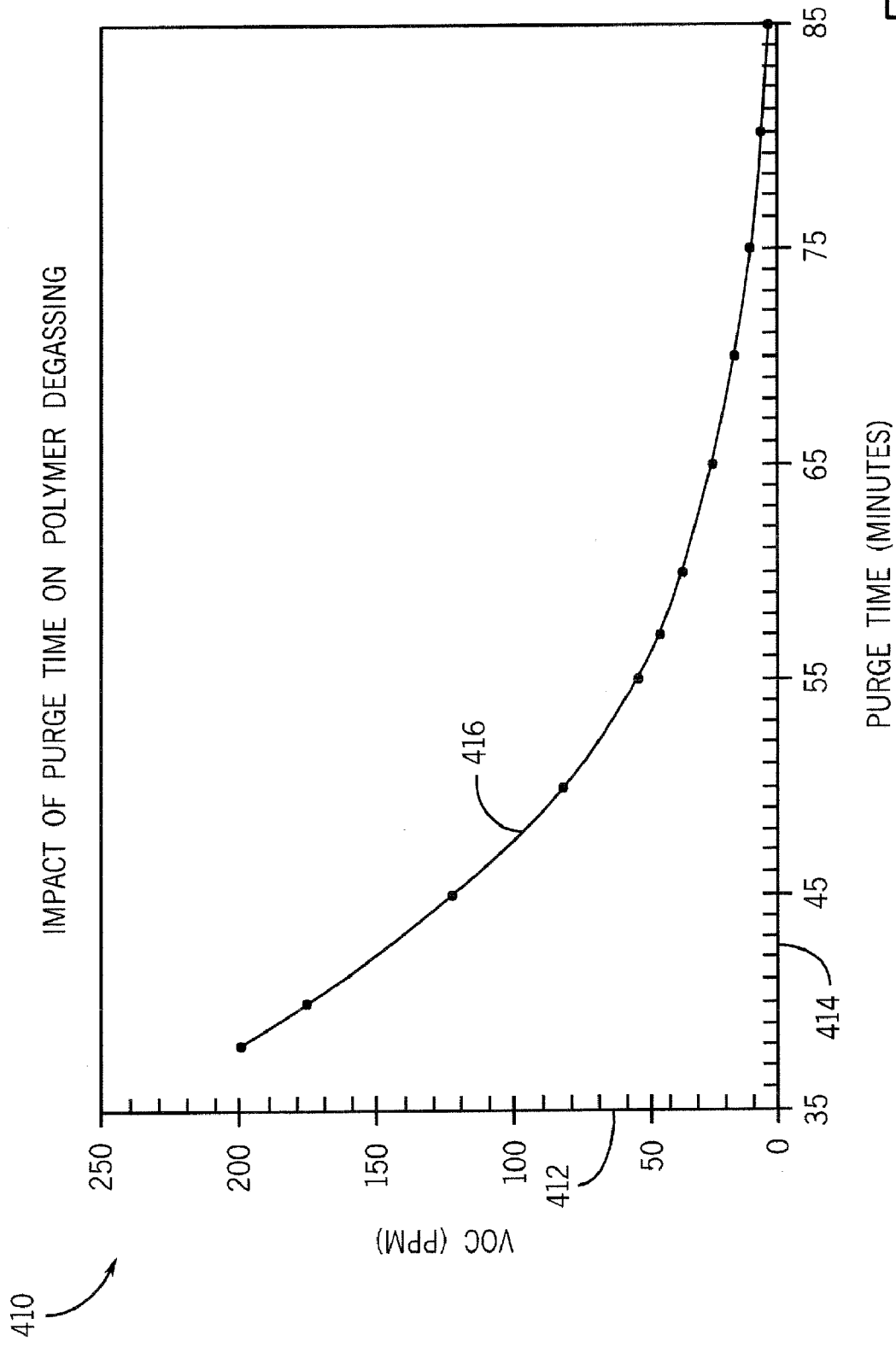
FIG. 12 is an exemplary plot of VOC (ppm) in the polymer fluff stream exiting a purge column versus the purge time (or residence time) in minutes in the purge column in accordance with one embodiment of the present techniques.

FIG. 12 is an exemplary plot 410 of model results of VOC 412 in ppm in the polyolefin (fluff) stream discharging from the purge column (e.g., purge column 228) versus the purge time 414 in minutes. In this embodiment, the purge time 414 is the residence time of the polyolefin fluff in the purge column. The curve 416 illustrates an example inverse relationship between VOC 412 and purge time 414. In this example, increasing purge time 414 from 60 minutes to 75 minutes (25% increase) resulted in about 73% reduction in VOC 412, from 34 ppm to 9 ppm. However, with this desired increase in purge time 414, production rate of polyolefin fluff discharging from the upstream polymerization reactor (e.g., loop reactor 210) was decreased by 20% in the model to account for inventory control in the purge column.

Figure 13:
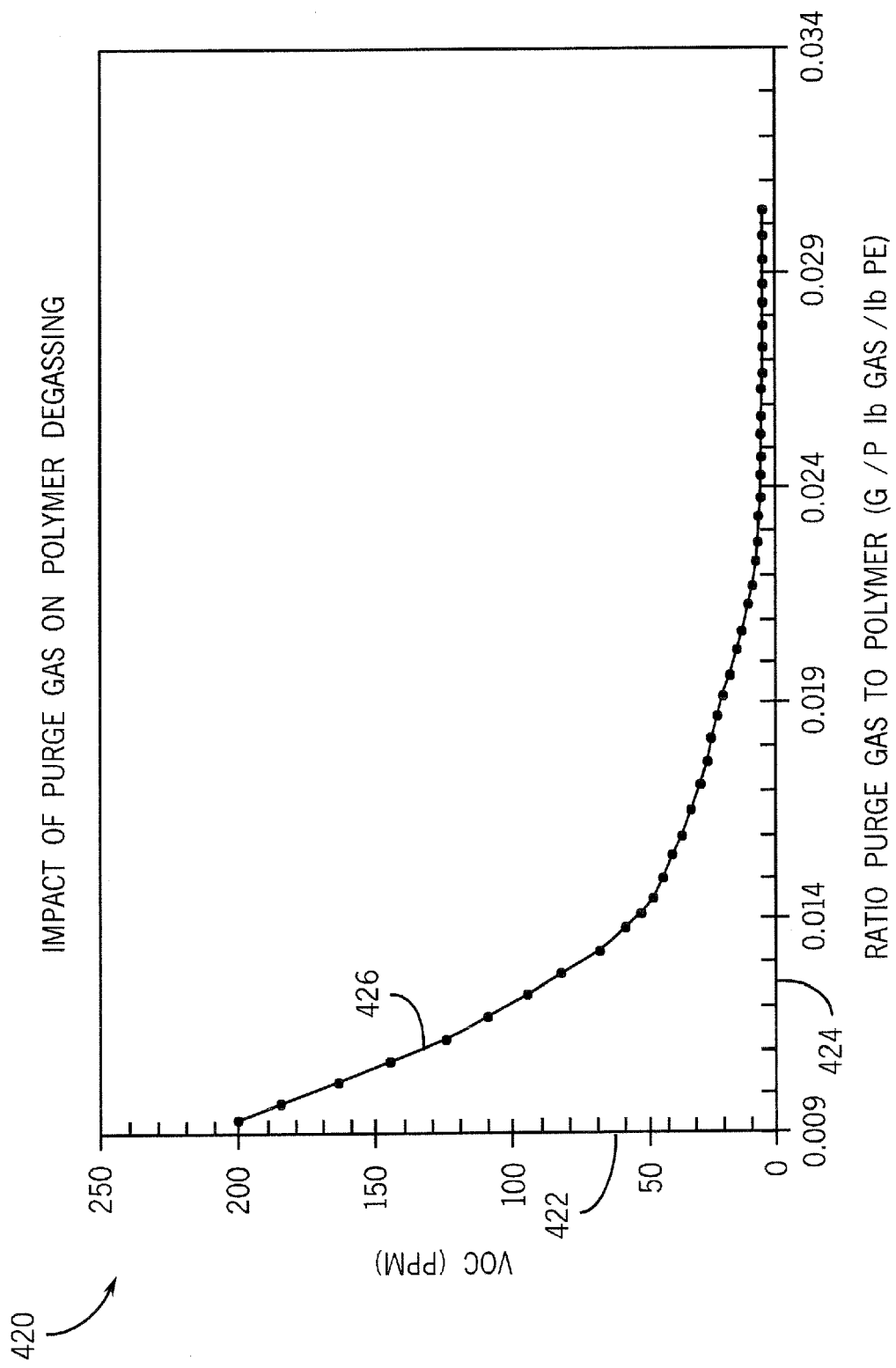
FIG. 13 is an exemplary plot of VOC (ppm) in the polymer fluff stream exiting a purge column versus the ratio of entering purge gas to polymer fluff (pound of gas per pound of polyethylene) in accordance with one embodiment of the present techniques.

FIG. 13 is an exemplary plot 420 of model results of VOC 422 in the polyolefin leaving the purge column versus the ratio 424 of the flow rate of purge gas (in this example, nitrogen) to the purge column to the flow rate of polyolefin polymer leaving the purge column. As with the aforementioned variables, the curve 426 illustrates an example inverse relationship of VOC 422 versus the ratio 424 of flow rates. In this embodiment of the model, increasing purge gas from 694 pounds per hour (lb/hr) to 810 lb/hr (17% increase) resulted in about a 40% reduction in VOC from 50 ppm to 30 ppm. In this calculation, the residence time and fluff temperature in the purge column were maintained constant.

Figure 14:
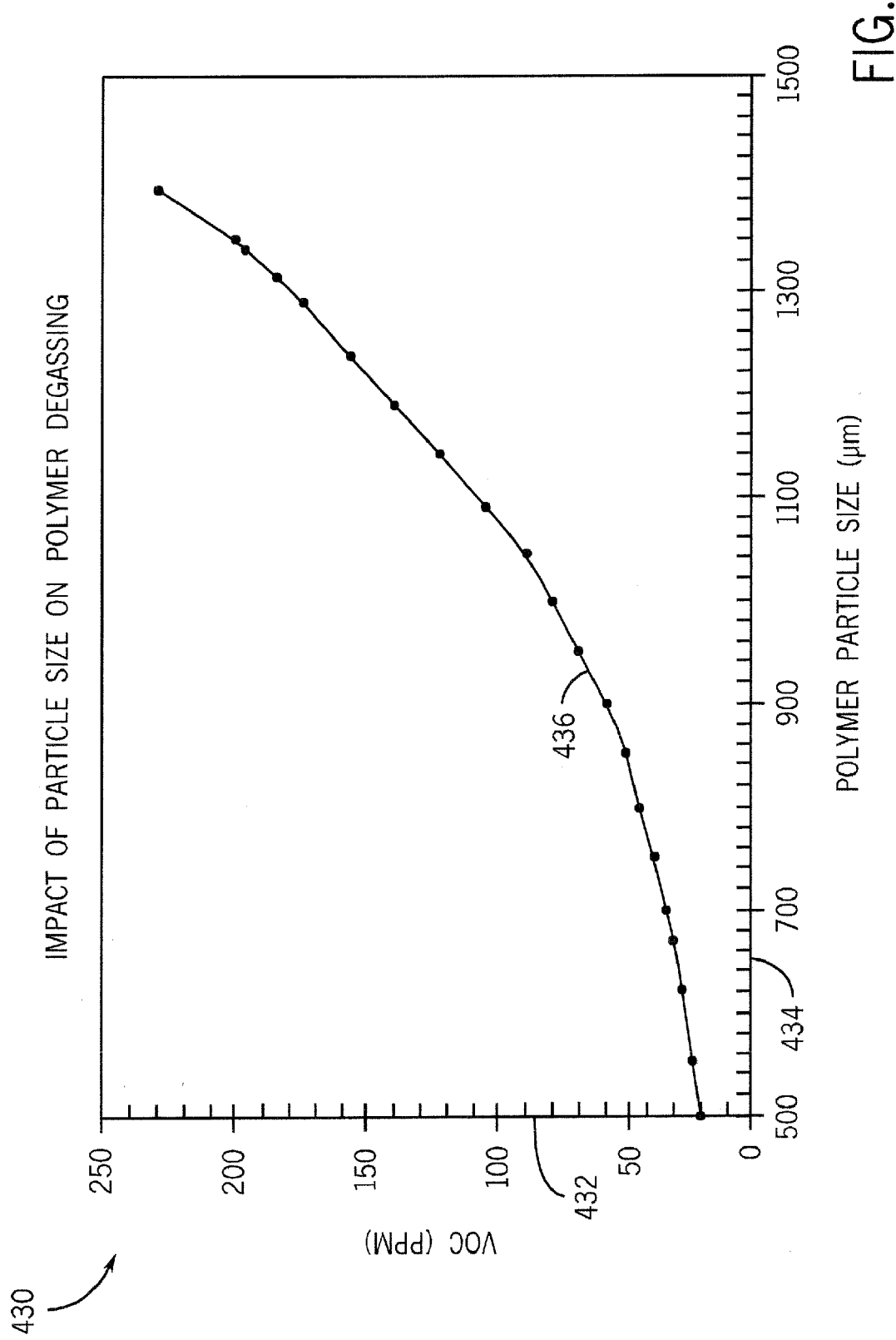
FIG. 14 is an exemplary plot of VOC (ppm) in the polymer fluff stream exiting a purge column versus the average particle size in microns (μm) of the polymer fluff in the purge column in accordance with one embodiment of the present techniques.

FIG. 14 is an exemplary plot 430 of model results of VOC 432 in the polyolefin (fluff) stream discharged from the purge column versus average particle size 434 in $10^{-6}$ meters (microns or μm) the polyolefin polymer (fluff). A proportional relationship exists between VOC 432 and polymer particle size 434, as illustrated by exemplary curve 436. In one sensitivity example of the model, with reducing fluff particle size from 800 microns to 600 microns (25% decrease), the VOC 432 was reduced by about 43% from 47 ppm to 26 ppm.

Figure 15:
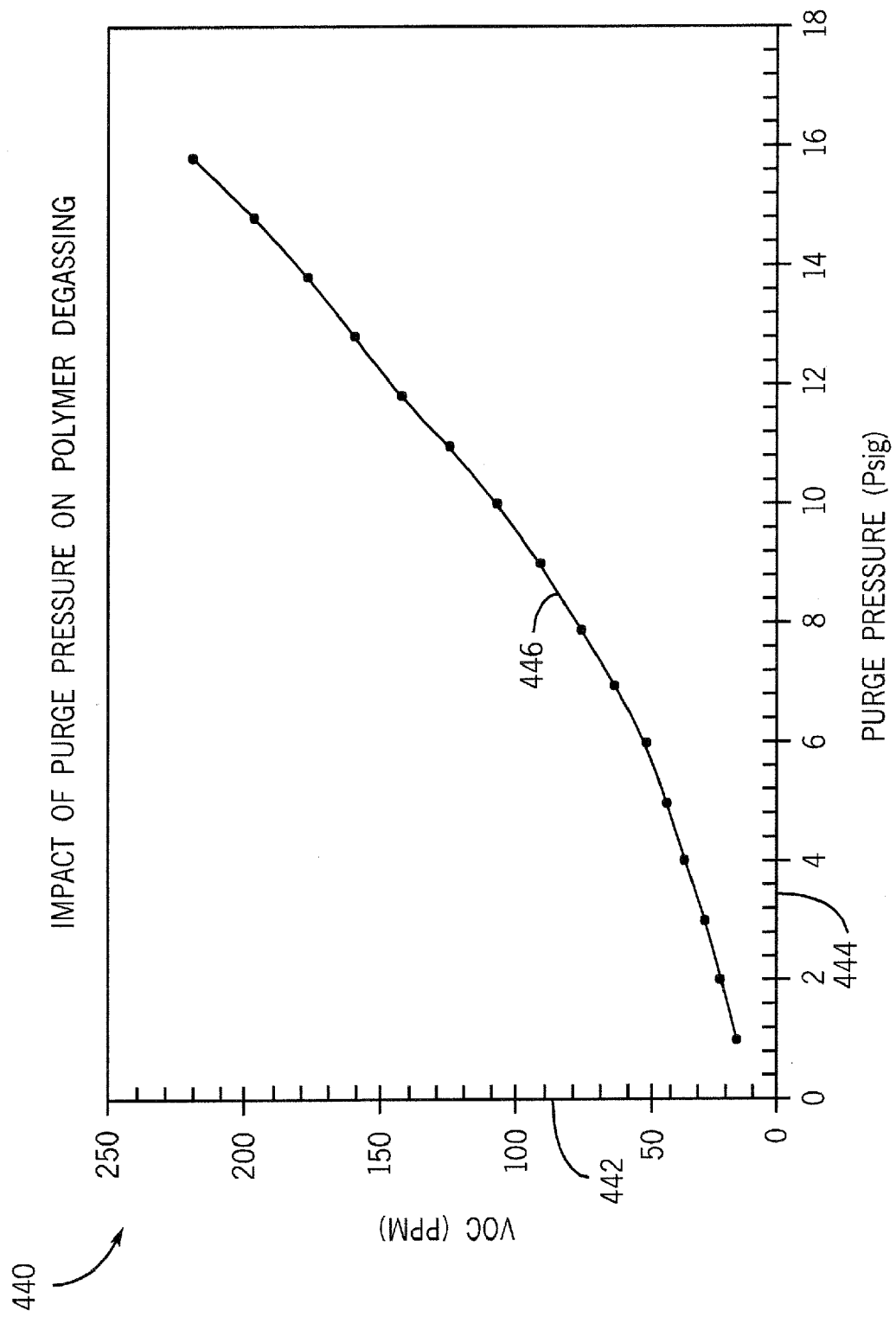
FIG. 15 is an exemplary plot of VOC (ppm) in the polymer fluff stream exiting a purge column versus the pressure (pounds per square inch or psig) of the purge gas (primarily nitrogen) entering the purge column in accordance with one embodiment of the present techniques.

FIG. 15 is an exemplary plot 440 of model results of VOC 442 in the polyolefin (fluff) stream discharged from the purge column versus the pressure 444 of the purge gas (e.g., inert gas) entering the purge column. The curve 446 illustrates an example proportional relationship between VOC 442 and purge pressure 444. In the exemplary model, reducing purge pressure 444 from 5 pounds per square inch (psig) to 3 psig, a 40% reduction, resulted in about a 36% reduction in VOC from 44 ppm to 28 ppm.

Figure 16:
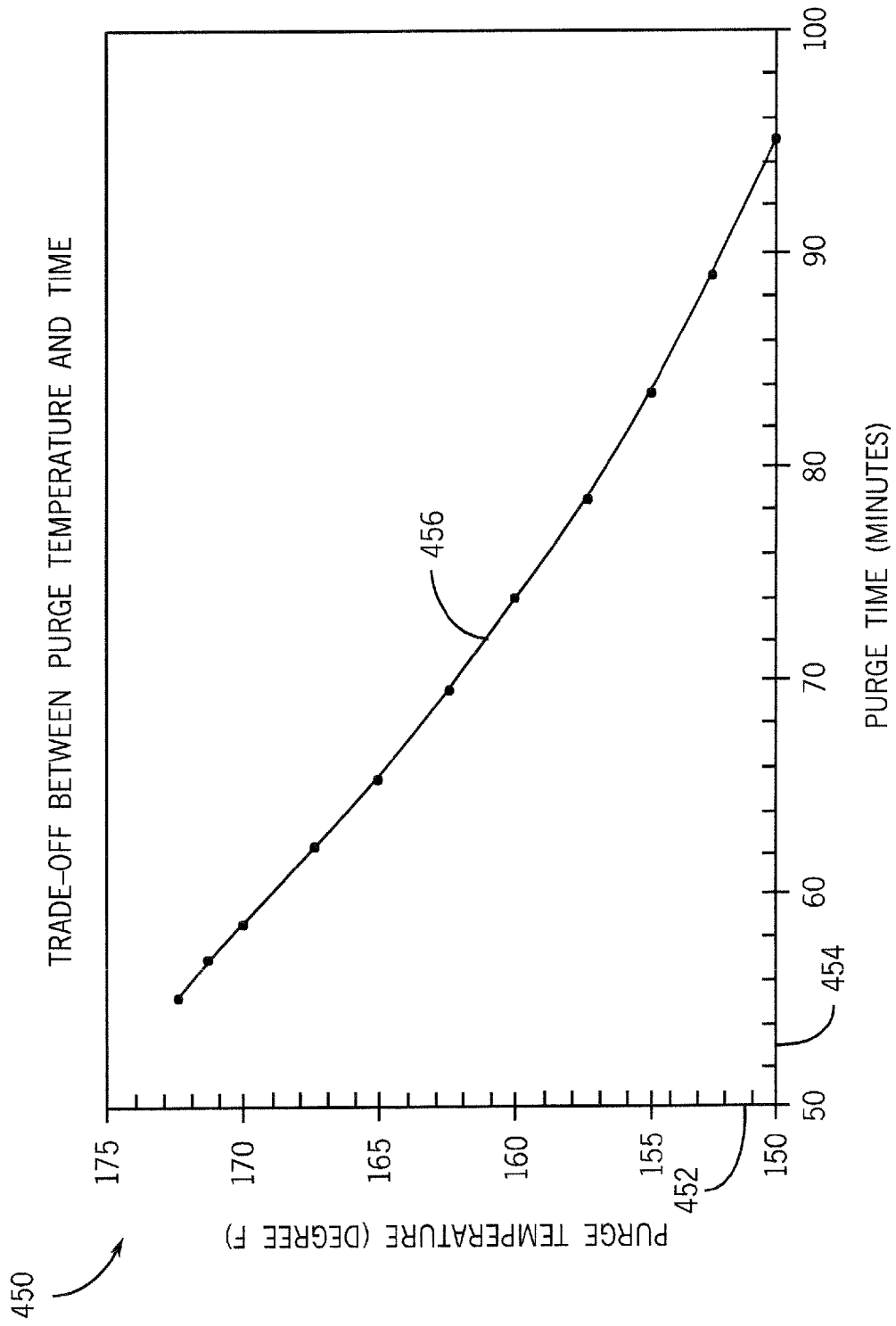
FIG. 16 is an exemplary plot of purge gas temperature (° F.) versus the purge time (minutes) in a purge column in accordance with one embodiment of the present techniques.

FIG. 16 is a plot 450 of exemplary model results of purge temperature 452 (i.e., temperature of the polyolefin in the purge column) versus the purge time 454 (i.e. residence time of the polyolefin in the purge column). The curve 456 represents the trade-off between purge temperature 454 (fluff temperature) and purge time 454 (residence time), while maintaining the constant VOC in the polyolefin stream and the inventory in the purge column. In these example results of the purge column model, an approximate 10% drop in purge (fluff) temperature from 170° F. to 153° F. generally corresponds to a need for about a 50% increase in purge time (residence time) in the purge column from 59 minutes to 88 minutes to maintain VOC (no increase) in the polyolefin stream discharging from the purge column.

Table 1 summarizes an exemplary order of the effects of the parameters on VOC reduction for an example resin in this case study. The example resin is grade TR-418F obtained from Chevron Phillips Chemical Company LP of The Woodlands, Tex. The resin TR-418F generally has a fluff bulk density of 0.90 to 0.97 pound per cubic feet. Ultimate applications of such a resin may include film, pipe, blow-molding, and the like. Analysis with the resin is only given as an example, and not meant to limit the present techniques to a particular resin or particular grade of resin. Moreover, the present techniques and purge column model may accommodate a variety of unimodal or bimodal polyolefin polymers or resins, resins produced with a single reactor or multiple reactors in series, and so on.

TABLE 1

Exemplary Impact/Order of purge parameter on VOC reduction for polymer

| | Parameter (Par) | | |
|---|---|---|---|
| | ΔPar/Par | ΔVOC/VOC | /ΔVOC/VOC/ ΔPar/Par/ |
| Temperature (F.) | 1.4% | −21.2% | 15.0 |
| Residence Time (min) | 7.3% | −30.2% | 4.2 |
| Purge Gas Flow (lb/hr) | 3.2% | −8.7% | 2.8 |
| Particle Size (μm) | 5.2% | 13.3% | 2.5 |
| Purge Pressure (psig) | −15.9% | −15.4% | 1.0 |

In this example of TR-418F polyolefin resin, the approximate order of significance in reducing VOC in the polyolefin polymer stream exiting the purge column is fluff temperature, residence time, purge gas (e.g., nitrogen) flow, fluff particle size, and purge pressure. In this embodiment, high fluff temperature had the most impact on VOC reduction for the polymer. Therefore, in this instance, the highest possible purge column fluff temperature achieves the highest possible recovery of hydrocarbons in the INRU and reduces potential VOC emissions in the plant. The highest possible purge column temperature may be generally achieved by running at the highest possible flash gas temperature before encountering temperature-related operational problems (e.g., limited by the softening point or melting point of the polyolefin). It should be noted that the flash gas temperature is generally controlled via the upstream flash line heaters. In this example, heating the purge gas has relatively little impact on degassing as the heat capacity of the purge gas (e.g., nitrogen) is typically low and the mass flow of the purge gas compared to the mass flow of the polymer is miniscule.

The reduced VOC observed for smaller fluff particle size suggests it may be beneficial to employ catalyst or reactor technology for producing polymer with smaller particle size. Apart from potential better circulation in the upstream polymerization reactor for such smaller particle resins, the small particles may lead to better degassing in the purge column for the resin, especially the low-density type. The selected minimum or low end of the polymer particle size may be determined by needs of circulation in the reactor, settling efficiency of the polyolefin fluff transfer systems.

In summary, the exemplary purge column models of the present techniques may present a significant contribution to the array of tools for supporting polyolefin production. The model can be used for plant support and for evaluating purge column designs and operation. The model is general and applies to the degassing of non-molten polyethylene resins, generally irrespective of their technology of production (liquid phase polymerization gas-phase polymerization, loop reactor, autoclave reactors, fluidized bed reactors, stirred reactors, etc.).

B. Exemplary Process Schematic of Model

Figure 17:
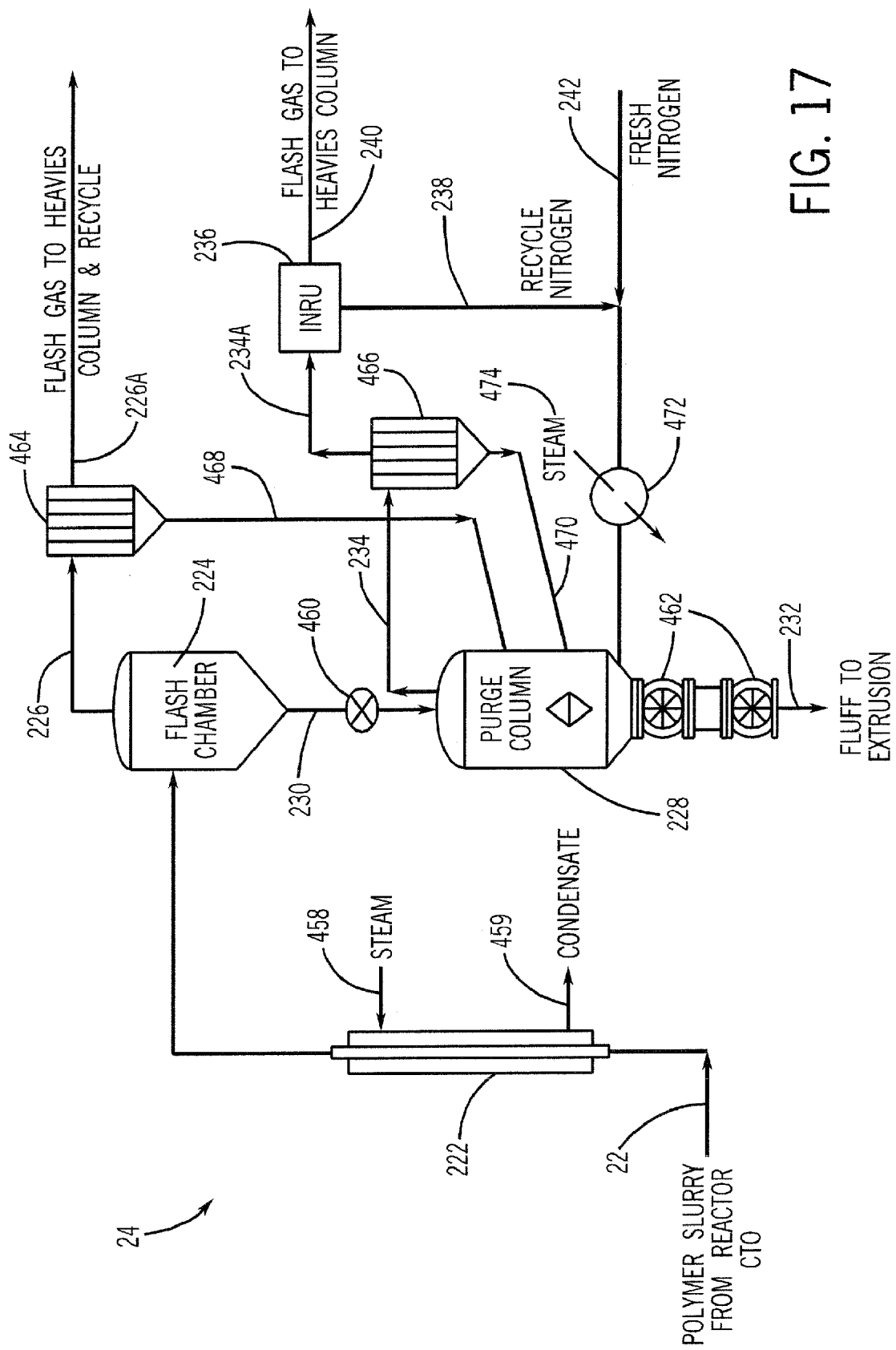
FIG. 17 is a model process schematic of an the diluent/monomer recovery system depicted in FIG. 5 in accordance with one embodiment of the present techniques.

FIG. 17 is an exemplary process schematic of one embodiment of the purge column model. FIG. 17 shows an exemplary diluent/monomer recovery system 24 including the flash line heater 22, flash vessel 224, and purge column 228. Hydrocarbon or diluent-rich polyolefin polymer slurry is withdrawn from the upstream polymerization reactor 210 (e.g., via a continuous take-off from the reactor 210). The slurry is heated in the flash line heater 222 with steam to boil-up the hydrocarbon liquid (e.g., diluent and unreacted monomer and comonomer) associated with the polymer into vapor. Steam 458 enters a jacket (i.e., annulus of outer conduit over inner conduit) of the flash line heater 222 and exits as steam condensate 459. More than one continuous take-offs (and more than one associated flash line heater 222) may be employed for a given reactor 210.

The polymer-vapor mixture is flashed in the flash tank 224 to separate out the hydrocarbon vapor (flash gas 226) from the polymer fluff (discharged as polyolefin stream 230). As discussed, in this embodiment, stream 230 which includes polymer fluff and any entrained hydrocarbon are sent to the purge column 228 for purging with recycled purge gas (nitrogen) 238 (and fresh purge gas (nitrogen) 242) to reduce the hydrocarbon content (or volatile organic content) of the polyolefin polymer to desirable or allowable limits. It should be noted that the flash gas 226 may be processed by a bag filter 464 (or cyclone) and the flash gas 226A then sent to a heavies column in the fractionation system 30, for example. Any solid particles recovered via the bag filter 464 may be sent to the purge column, for example. Likewise, the overhead hydrocarbon-rich purge gas 234 exiting the top of the purge column 228 may be processed in a bag filter 466, where solids 470 (e.g., polymer solids) are removed and returned to the purge column 228.

The process configuration for the present models may incorporate a discharge of polyolefin polymer form the flash vessel 224 to travel through a rotary valve 460, as well as through other equipment, such as fluff surge chambers, etc. Also, the nitrogen entering the purge column may be heated in a heat exchanger 472 employing steam 474, for example. Further, the polyolefin fluff exiting the bottom portion of the purge column may travel through one or more rotary valves 462 and 232 in the extrusion part of the plant.

As indicated, several factors may influence the effectiveness of the purge column 228 in degassing the polymer, namely, purge temperature, purge time, purge gas (nitrogen) purity and flow rate, particle size, purge pressure, polymer density, and so on. The present techniques provide for one or more models for designing and rating purge columns 228 to select the various mix of parameters for the effective purging of polymer resins. Again, while portions of the present discussion may focus on construction and use of a model for purge columns 228 in the loop slurry polyethylene plant, the model is readily applicable and adaptable to address the purging of polymer in general, such as in the loop polypropylene plants, gas-phase plants, and so forth.

C. Model Description

It is assumed in embodiments of the purge column model that the purge time is the residence time ($T_{res}$) of polymer in the purge column. Thus, if the production rate of the plant is $W_{PE}$, the inventory of polymer in the column ($W_{inv}$) is, $$W_{inv} = W_{PE} * T_{res} \quad (1)$$

Then, given the bulk density of polymer ($\rho_b$) in the column and the diameter of the column ($D_{bed}$), the height of inventory in the column ($H_{bed}$) becomes, $$H_{bed} = W_{inv}/(0.25\pi D_{bed}^2 \rho_b) \quad (2).$$

For an operating plant, the inventory of the purge column is generally expressed as a fraction ($f_{bed}$) of the operating window between the minimum inventory level ($H_{LL}$) and the maximum inventory level ($H_{HL}$) of the column. In which case the inventory level for the column becomes, $$H_{bed} = H_{LL} + f_{bed} * (H_{HL} - H_{LL}) \quad (3).$$

Therefore, the residence time and the material inventory for the purge column can be estimated for an operating plant from equations 1-2. Having determined the residence time and inventory for the purge column, the next step in the model may be to estimate the height of a separation stage (HETP) and the number of stages (N) for the column, $$N = H_{bed}/HETP \quad (4).$$

Figure 18:
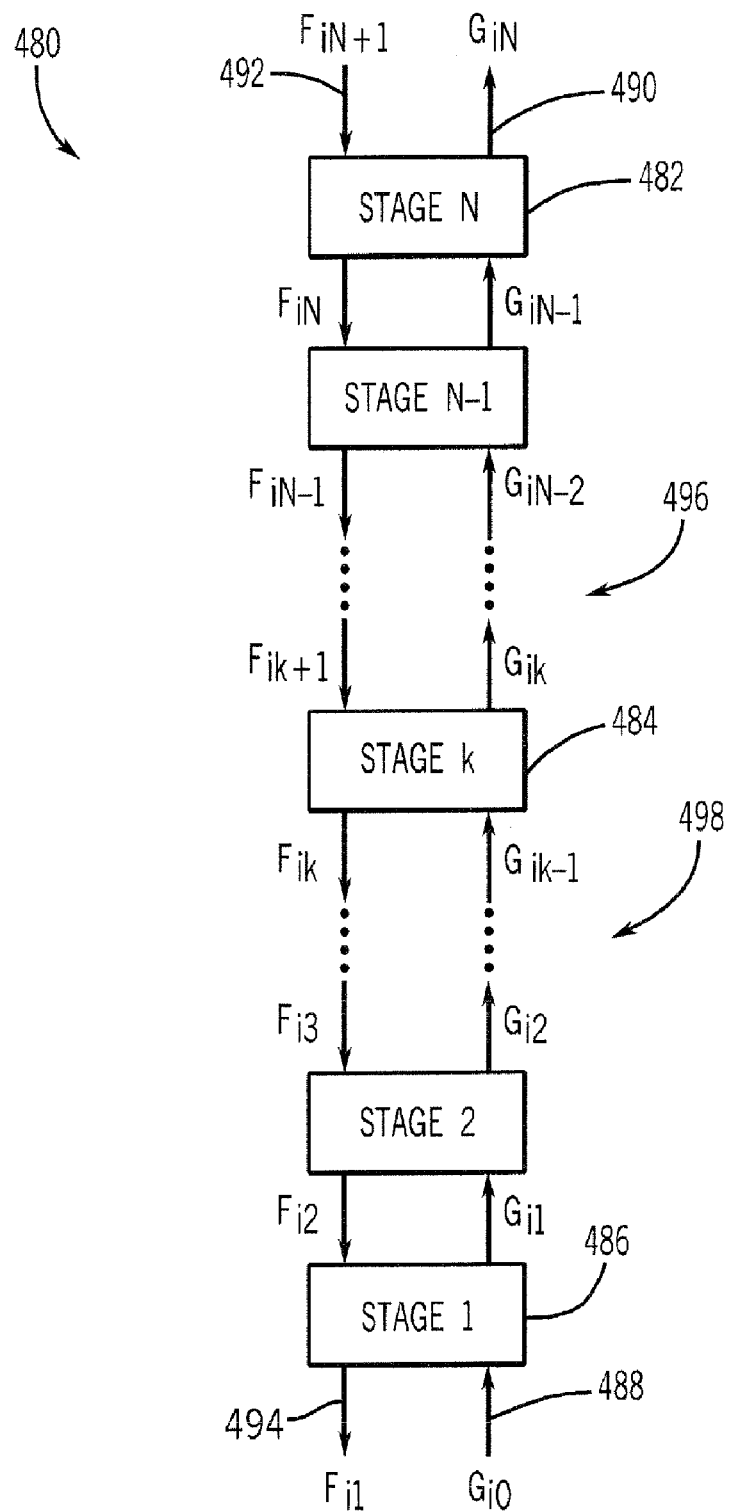
FIG. 18 is a material balance schematic for a an exemplary purge column in accordance with one embodiment of the present techniques.

In one example, the method of Oanda and et al. (Kister, 1992) is used in the model to estimate HETP for the column and its number of separation stages. FIG. 18 depicts the stage-wise material flow 480 having stages 484 for a component i (e.g., a particular hydrocarbon such as isobutane) in the purge column. As shown, stage 1 (486) is the bottom of the column, stage N (482) is the top of the column, the polymer being purged is fed at the top (at 492) of the column, and the purge gas (e.g., nitrogen) is fed at the bottom (at 488) of the column. The hydrocarbon purge gas leaves the top (at 490) of the column and the polymer leaves the bottom (at 494) of the column. The material balance for a component (i) for a stage (k) in the column is therefore, $$F_{ik+1} + G_{ik-1} = F_{ik} + G_{ik}; k=1,\ldots,N \quad (5).$$

The terms $F_{ik+1}$ and $F_{ik}$ are, respectively, the component mass flows in the polymer entering and leaving the stage. Similarly, $G_{ik-1}$ and $G_{ik}$ are the component mass flows for the gas entering and leaving the stage. The mass balance in equation 5 can be expressed in terms of component degassing rate for a stage ($E_{ik}$) as follows, $$E_{ik} = F_{ik+1} - F_{ik} = W_{PE}(X_{ik+1} - X_{ik}); k=1,\ldots,N; i=1\ldots NC \quad (6a)$$

$$E_{ik} = G_{ik} - G_{ik-1} = G_k Y_{ik} - G_{k-1} Y_{ik-1}; k=1,\ldots,N; i=1\ldots NC \quad (6b).$$

Equation 6a gives the material balance for the polymer-phase in the column, while equation 6b gives the material balance for the gas-phase in the column. The $X_{ik+1}$ and $X_{ik}$ (equation 6a) are the mass fractions of component in the polymer entering and leaving the stage, while $Y_{ik-1}$ and $Y_{ik}$ (equation 6b) are the corresponding mass fractions for the purge gas for the stage. Equation 6a assumes that the amount of hydrocarbon dissolved in the polymer is small compared to the quantity of the polymer.

In these embodiments, the above material balance equations assume that the hydrocarbon contents of the polymer ($F_{iN+1}$ and $X_{iN+1}$) for degassing in the purge column are known. In the loop process, $F_{iN+1}$ and $X_{iN+1}$ can be estimated from the upstream flash gas (e.g., flash gas 226) composition of either the upstream flash vessel (e.g., flash vessel 224, high pressure flash, intermediate pressure flash vessel, low pressure flash vessel, etc.), assuming equilibrium between the flash gas and the polymer. Of course, both flow and composition are usually known for the purge gas (i.e. $G_{i0}$ and $Y_{i0}$). Thus, in this example, the material feeds to the column are defined. The model estimates the material streams (flow and composition) leaving the column: $F_{i1}$ and $X_{i1}$ for the polymer and $G_{iN}$ and $Y_{iN}$ for the gas.

In this example, assuming spherical particles for the polymer and using correlations by Qi et. al. (1996), one can estimate the mass fraction of components for the polymer for a stage in the column as follows, $$X_{ik} = (X_{ik+1} - X_{isk})\Phi_{ik} + X_{isk} \tag{7}$$

$$\Phi_{ik} = \sum_{n=1}^{\infty} \frac{6}{n^2\pi^2} \exp\left(-\frac{n^2\pi^2 D_i t_k}{R_p^2}\right) \tag{8a}$$

$$t_k = T_{res}/N \tag{8b}$$

where:

$X_{isk}$=Surface mass fraction of component for polymer particle $D_i$=Diffusion coefficient for component for polymer (sqcm/s)

$t_k$=Residence time for polymer for stage k (s)

$R_p$=Mean radius for polymer particle (cm).

If the component in the gas leaving a stage is assumed to be in equilibrium with the component on the surface of the polymer leaving the stage, the surface concentration for component in the polymer can be estimated from Hutchinson and Ray correlation (1987), for example, as follows, $$X_{isk} = \alpha_v * KVLE_i * P_{atm} * y_{ik} * MW_i/(1000 * \rho_{PE}) \tag{9}$$

$$Log(KVLE_i) = -2.38 + 1.08(T_{ci}/T)^2 \tag{10a}$$

$$\alpha_v = (\rho_{cr} - \rho_{PE})/(\rho_{cr} - \rho_{am}) \tag{10b}$$

where:

$\alpha_v$=Fraction amorphous phase for polymer $KVLE_i$=Equilibrium constant for component for polyethylene $P_{atm}$=Purge column pressure (atm)

$y_{ik}$=Mole fraction for component for purge gas leaving stage k $MW_i$=Molecular weight of component $\rho_{PE}$=Polymer density (g/cc)

$T_{ci}$=Critical temperature for a component

T=Temperature of purge column $\rho_{am}$=Amorphous density of polymer (~0.852 g/cc)

$\rho_{cr}$=Crystalline density of polymer (~1.01 g/cc).

Hutchinson and Ray's correlations (equations 9-10) may accommodate a wide range of polyethylene resins, from the amorphous (e.g. LLDPE) to the less amorphous (e.g. HDPE). These exemplary correlations, therefore, are suitable for estimating hydrocarbon and non-hydrocarbon solubility in all polyethylene resins, from the loop slurry process or other processes.

D. Model Solution

In certain embodiments, the model may be solved by closing the overall material balance for the column, expressed as, $$DF_i = F_{iN+1} + G_{i0} - F_{i1} - G_{iN} \tag{11}$$

The term $DF_i$ is the difference in material flow to and from the column for a component. In the examples, the model solution means driving this difference ($DF_i$) to zero or to a negligible value (e.g., $10^{-6}$) for all components in the column. This solution method for the column is generally iterative with material flows to and from the column counter-current, with the feed streams (polymer and purge gas) known, and the product streams (degassed polymer and hydrocarbon-rich vapor) typically unknown a priori. Thus, in this example, an initial value of one of the product streams from the column, vapor ($G_{iN}$) or polymer ($F_{i1}$), is estimated (e.g., an initial guess based on operating experience) to begin the column solution. The estimated stream is varied iteratively until generally all material balances for the column are closed. As an example, the vapor stream leaving the top of the column may be assumed and the steps in the algorithm in Table 2 followed to solve the material balance for the column.

TABLE 2

Exemplary Algorithm for Solving Purge Column Model

1. Assume vapor flow from the column (i.e. $G_{iN}$, $y_{iN}$).
2. Estimate from $y_{iN}$ and equation 9 the surface concentration ($X_{isN}$) of component for polymer particles leaving stage N.
3. Estimate from $X_{isN}$ and equation 7 the bulk concentration of component ($X_{iN}$) for the polymer leaving stage N, the amount still adsorbed in the polymer ($F_{iN} = W_{PE}X_{iN}$), and the amount degassed for stage N (i.e. $E_{iN} = W_{PE}(X_{iN+1} - X_{iN})$. Note that the feed composition of polymer ($X_{iN+1}$) to the column is known.
4. Estimate from the material balance in equation 6(a, b) the vapor feed to stage N from stage N – 1 (i.e. $G_{iN-1} = G_{iN} - E_{iN}$) and its mole fraction ($y_{iN-1}$).
5. Repeats steps 2-4 for stages k = N – 1, N – 2, . . . , 2, 1.
6. Evaluate $DF_i$ (equation 11) to check for material balance closure for the column.
   a. If $|DF_i| = 0$ (or $10^{-6}$), model solved and stop iteration.
   b. If $|DF_i| > 0$ (or $10^{-6}$), continue iteration by adjusting the vapor flow from the column ($G_{iN}$ and $y_{iN}$) and repeating steps 2-6 until step 6a is satisfied.

E. Model Construction and Interface

Figure 19:
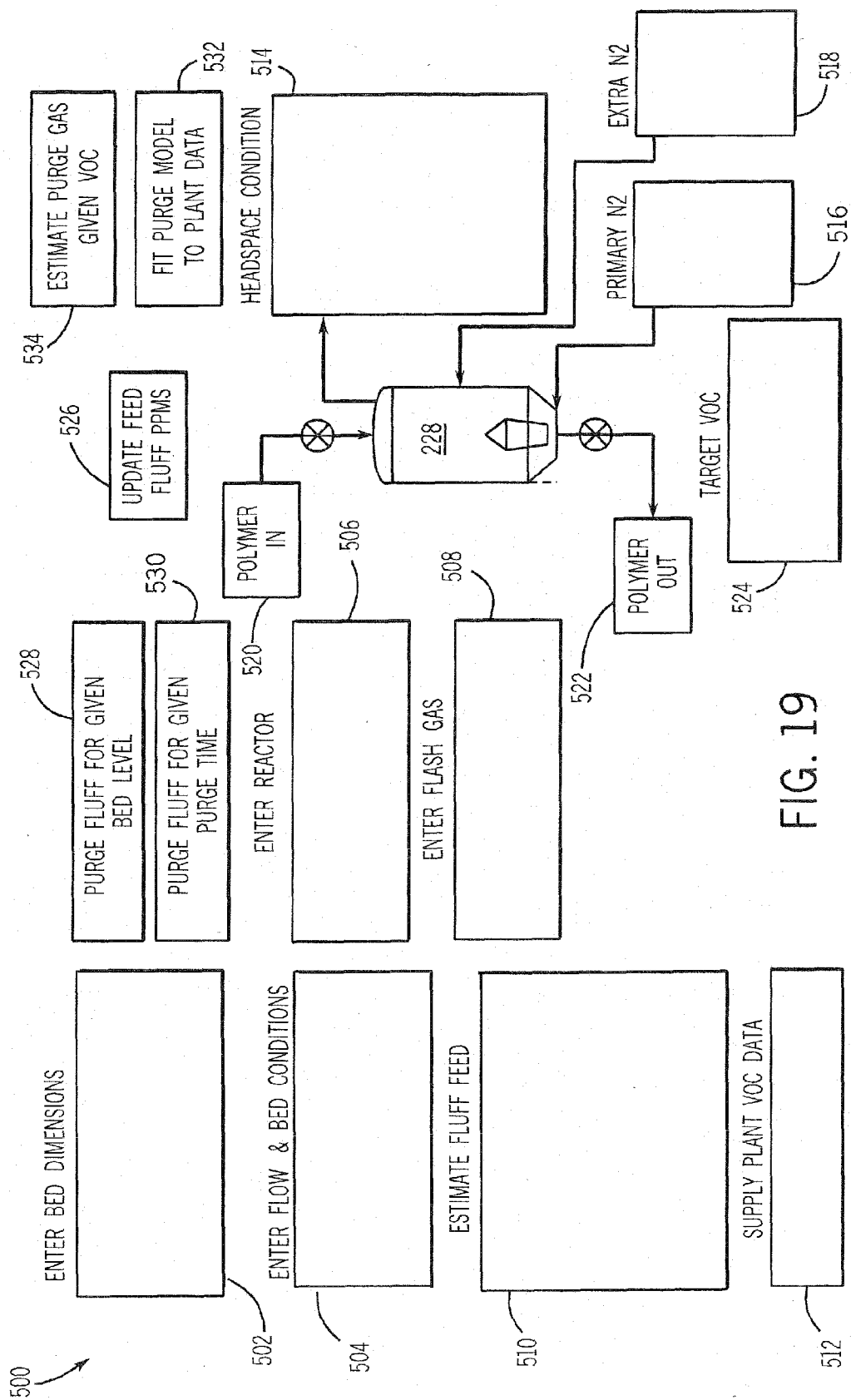
FIG. 19 is a schematic of an exemplary interface for a purge column model in accordance with one embodiment of the present techniques.

As an example, the model may be implemented in Visual Basic Applications with an Excel worksheet as an interface (see, e.g., FIG. 19) for model input and output. Instructions for running the model may be provided to the user or for automatically operating the model. FIG. 19 depicts an exemplary interface 500 for the purge column models. The interface 500 is a spreadsheet having parts or boxes 502, 504, 506, 508, 510, 512, 514, 516, 518, and 520 for inputting data (e.g., into spreadsheet cells within the boxes). These parts or boxes may also provide model output in spreadsheet cells. Input cells may be highlighted in a different color than output cells, for example. The inputs and outputs may be the individual hydrocarbon component concentrations and the total VOC. VOC results may be provided in box 522. Purge gas results may be input or output in box 424 in this exemplary interface As shown in the model interface of FIG. 19, apart from the primary purge gas feed 516 to the bottom of the column 228; the model can also simulate the impact on purging the use of secondary purge gas 518 on a stage in the column 228.

In this exemplary interface, which may be displayed on a monitor of a personal computer, for example, boxes 502 through 510 provide for model inputs. Model results may also be displayed in these boxes and calculated automatically by the model. Lastly, buttons 526, 528, and 530 (e.g., with underlying Visual Basic commands) may be selected or clicked to operate the model based on different types of inputs and constraints. In this example, button 526 may be selected to estimate ppm composition of the individual hydrocarbon components in the fluff feed to the purge column (displayed in box 510) based on data supplied by the user in boxes 506 and 508.

In this exemplary interface, to run the model, the user may supply bed level data in box 504, and then select or click on (i.e., with a mouse pointer) button 528 to run the command "Purge Fluff for Given Bed Level" to estimate the residence time of the purge column and the fluff VOC after purging for that length of time. On the other hand, the user may supply the purge time in box 504 and then select the button 530 to run the command "Purge Fluff for Given Purge Time" to estimate the fluff VOC after purging for that length time.

The predicted fluff VOC may differ from plant data, if known. In this case, known plant data may be placed in box 512 in this interface, and the button 532 selected to run the command "Fit Purge Model to Plant Data" to adjust diffusion parameters in the model to fit model predictions to the plant data. Given desired VOC for polymer, model can estimate the purge gas flow to achieve this goal. To do this, VOC target data may be entered in the interface in box 524, and the button 534 selected to run the command "Estimate Purge Gas Given VOC" to estimate the purge gas rate composition to satisfy the VOC target for the polymer fluff exiting the purge column 228.

F. Model Validation

Plant data were collected from polyethylene operating facilities for validating the model. Paired sample data was collected, a sample of the feed from the flash tank to the purge column, and a sample of the polymer fluff leaving the purge column. Sampling procedures for testing VOC in the manufacturing facility may involved connecting a sample cylinder to a sample port at the top or bottom of the purge column and opening and closing valves on the port and cylinder to collect the sample. The date and time of each sample collection may be recorded for the retrieval of process data for the column from the plant data historian at later dates. The samples may be then analyzed in the laboratory in the plant facility to measure the hydrocarbon content of each polymer fluff sample, within 10 minutes of collection, for example. Organic or hydrocarbon entrainment may be estimated for each sample. An exemplary entrainment calculation includes estimating the void volume between polymer particles in the feed to the purge column and the mass of flash gas from the flash tank that will be contained in this volume, as follows, $$Ent_i = y_i * P * MW_i * W_{PE}(1/\rho_b - 1/\rho_{PE})/RT \quad (12)$$

where:
$Ent_i$=Entrainment for a component (lb/hr)
$MW_i$=Molecular weight of a component
P=Flash tank pressure (atm)
R=Gas constant (0.7304 atm·cuft/lb-mole·R)
T=Flash tank temperature (F)
$W_{PE}$=Reactor production rate (lb/hr)
$y_i$=Flash gas component mole fraction
$\rho_b$=Fluff bulk density (lb/cuft)
$\rho_{PE}$=Polymer solid density (lb/cuft).

Entrainment corrections may or may not include hydrocarbons from process leaks, which are difficult to measure or even estimate. A strategy for accounting for process leaks may be to add a fraction of gas from the flash tank to the entrainment gas, depending on the pressure difference between the flash tank and the purge column, and so on. In certain examples, it is believed that such leaks could account for about 4% of material flows around the purge column in plants.

A summary of equation variables is listed below.
Notations
$D_{bed}$ Purge column diameter (ft)
$D_i$ Coefficient of diffusion for a component (m²/s)
$DF_i$ Material balance error for a component (lb/hr)
$E_{ik}$ Degassing rate of component for polymer (lb/hr)
$Ent_i$ Entrainment for a component (lb/hr)
$f_{bed}$ Bed level fraction in purge column (%)
$F_{ik}$ Flow rate for a stage for adsorbed component for polymer (lb/h)
$G_k$ Flow rate for a stage for purge gas (lb/h)
$G_{ik}$ Flow rate for a stage for a component for purge gas (lb/h)
HETP Height of a stage in purge column (in)
$H_{bed}$ Inventory level of polymer in purge column (ft)
$H_{LL}$ Minimum inventory level for purge column (ft)
$H_{HL}$ Maximum inventory level for purge column (ft)
$MW_i$ Molecular weight of a component
$KVLE_i$ Equilibrium constant for a component for polymer
N Number of stages for purge column
NC Number of material components in the purge column
P Flash tank pressure (atm)
$P_{atm}$ Purge column pressure (atm)
PPM Mass fraction of component in polymer
R Ideal gas constant (0.7304 atm·cuft/lbmol·R)
$R_p$ Radius of polymer particle (m)
$T_{ci}$ Temperature of emulsion phase in the bed (F)
T Purge column or flash tank temperature (F)
$t_k$ Purge column residence of polymer for a stage (s)
$T_{res}$ Purge column polymer residence time (h)
$W_{inv}$ Purge column inventory (lb)
$W_{PE}$ Polymer withdrawal rate for reactor (lb/h)
$X_{ik}$ Average mass fraction of component for polymer
$X_{isk}$ Mass fraction of component at polymer particle surface
$y_{ik}$ Mole fraction of component for purge gas for a stage
Greek Letters
$\alpha_v$ Fraction of amorphous phase for polymer
$\rho_{am}$ Density of amorphous polymer (g/cc)
$\rho_{cr}$ Density of crystalline polymer (g/cc)
$\rho_b$ Bulk density of polymer (lb/cuft)
$\rho_{PE}$ Density of polymer (g/cc)
$\Phi_{ik}$ Parameter for a stage in equation 8a
Indices
i A component in the purge column or flash tank
k A stage in the purge column.

What is claimed is:

1. A method for operating a polyolefin manufacturing process, comprising:
   purging a recovered polyolefin stream comprising polyolefin particles and residual hydrocarbon in a purge column with a purge gas to remove a first portion of the residual hydrocarbon from the recovered polyolefin stream;
   discharging a polyolefin product stream from the purge column, the polyolefin product stream having a second portion of the residual hydrocarbon, wherein the second portion comprises a volatile organic content (VOC) of the polyolefin product stream; and
   calculating an estimated value representing the VOC of the polyolefin product stream based on a flow rate of the polyolefin particles flowing through the purge column and a flow rate of the purge gas flowing through the purge column.

2. The method as recited in claim 1, comprising adjusting a residence time of the polyolefin particles in the purge column based on the estimated value representing the VOC.

3. The method as recited in claim 1, comprising adjusting a flow rate of the purge gas entering the purge column based on the estimated value representing the VOC.

4. The method as recited in claim 1, comprising adjusting a temperature of the polyolefin particles in the purge column based on the estimated value representing the VOC.

5. The method as recited in claim 4, wherein adjusting a temperature of the polyolefin particles in the purge column comprises adjusting an operating temperature of an upstream flash vessel that separates flashed hydrocarbon from a slurry discharging from a polyolefin reactor.

6. The method as recited in claim 4, wherein adjusting a temperature of the polyolefin particles in the purge column comprises adjusting an operating temperature of an upstream flash line heater that flashes hydrocarbon from a slurry discharging from a polyolefin reactor.

7. The method as recited in claim 1, comprising changing, based on the estimated value representing the VOC, a type of catalyst employed in a polymerization reactor that produces the polyolefin particles.

8. The method as recited in claim 1, wherein calculating an estimated value representing the VOC comprises iteratively driving a difference in flow values for material flow to and from the purge column to zero for all components of the purge column.

9. The method as recited in claim 8, wherein calculating an estimated value representing the VOC comprises:
    estimating an initial value of a specified product stream from the purge column; and
    varying the initial value iteratively until the difference in flow values for material flow to and from the purge column is approximately equal to zero for all components of the purge column.

10. A method for operating a polyolefin manufacturing process, comprising:
    purging a recovered polyolefin stream comprising polyolefin particles and residual hydrocarbon in a purge column with a purge gas to generate a discharge stream comprising a first portion of the residual hydrocarbon and the purge gas and a polyolefin product stream comprising the polyolefin particles and a second portion of the residual hydrocarbon, wherein the second portion comprises a volatile organic content (VOC) of the polyolefin product stream;
    discharging the polyolefin product stream from the purge column;
    calculating an estimated value representing the VOC of the polyolefin product stream based on a flow rate of the polyolefin particles flowing through the purge column and a flow rate of the purge gas flowing through the purge column; and
    adjusting an operating condition of the purge column based on the estimated value representing the VOC.

11. The method of claim 10, comprising processing the polyolefin particles to form a polyolefin product.

12. The method of claim 10, wherein adjusting an operating condition of the purge column comprises adjusting a residence time of the purge column, a temperature of the purge column, or the flow rate of the purge gas stream, or a combination thereof.

13. The method as recited in claim 10, wherein calculating an estimated value representing the VOC comprises iteratively driving a difference in flow values for material flow to and from the purge column to zero for all components of the purge column.

14. The method of claim 10, wherein calculating an estimated value representing the VOC comprises:
    determining an initial value for a component mass flow rate of a purge gas stream entering a bottom stage of the purge column; and
    varying the initial value iteratively until a difference in material flow to and from the purge column is approximately equal to zero for all components of the purge column.

15. The method of claim 10, wherein calculating an estimated value representing the VOC comprises:
    determining an initial value for a component mass flow rate of the polyolefin product stream discharging from the purge column; and
    varying the initial value iteratively until a difference in material flow to and from the purge column is approximately equal to zero for all components of the purge column.

* * * * *